United States Patent
Yamamoto et al.

(10) Patent No.: US 11,851,822 B2
(45) Date of Patent: Dec. 26, 2023

(54) OIL-RESISTANT AGENT FOR PAPER

(71) Applicant: DAIKIN INDUSTRIES, LTD., Osaka (JP)

(72) Inventors: Yuuki Yamamoto, Osaka (JP); Michio Matsuda, Osaka (JP); Tetsuya Uehara, Osaka (JP); Hirotoshi Sakashita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 214 days.

(21) Appl. No.: 17/169,842

(22) Filed: Feb. 8, 2021

(65) Prior Publication Data
US 2021/0164165 A1    Jun. 3, 2021

Related U.S. Application Data

(63) Continuation of application No. PCT/JP2019/036157, filed on Sep. 13, 2019.

(30) Foreign Application Priority Data

Sep. 14, 2018  (JP) ................................ 2018-172670
Mar. 5, 2019   (JP) ................................ 2019-039667

(51) Int. Cl.
| | | |
|---|---|---|
| *D21H 21/18* | (2006.01) | |
| *C09D 7/65* | (2018.01) | |
| *C08F 220/18* | (2006.01) | |
| *C08F 220/36* | (2006.01) | |
| *C09D 5/00* | (2006.01) | |
| *C09D 103/02* | (2006.01) | |
| *D21H 17/28* | (2006.01) | |
| *D21H 17/37* | (2006.01) | |
| *D21H 19/12* | (2006.01) | |
| *D21H 27/10* | (2006.01) | |

(52) U.S. Cl.
CPC ....... *D21H 21/18* (2013.01); *C08F 220/1812* (2020.02); *C08F 220/1818* (2020.02); *C08F 220/36* (2013.01); *C09D 5/00* (2013.01); *C09D 7/65* (2018.01); *C09D 103/02* (2013.01); *D21H 17/28* (2013.01); *D21H 17/37* (2013.01); *D21H 19/12* (2013.01); *D21H 27/10* (2013.01); *C08F 2800/20* (2013.01)

(58) Field of Classification Search
CPC ........... D21H 7/37; D21H 19/20; D21H 21/14
USPC ......................................................... 162/135
See application file for complete search history.

(56) References Cited

FOREIGN PATENT DOCUMENTS

| | | |
|---|---|---|
| EP | 1 010 807 A1 | 6/2000 |
| EP | 2 977 397 A1 | 1/2016 |
| JP | 4-209682 A | 7/1992 |
| JP | 9-2540 A | 1/1997 |
| JP | 2000-154493 A | 6/2000 |
| JP | 2005-9017 A | 1/2005 |
| JP | 2006-028697 A | 2/2006 |
| JP | 2007-138318 A | 6/2007 |
| JP | 2012-67402 A | 4/2012 |
| JP | 2013-35600 A | 2/2013 |
| JP | 2013-237941 A | 11/2013 |
| JP | 2014-025163 A | 2/2014 |
| JP | 2014-214250 A | 11/2014 |
| JP | 2015-120895 A | 7/2015 |
| KR | 10-2016-0035576 A | 3/2016 |
| WO | 2013/008938 A1 | 1/2013 |
| WO | 2015/111866 A1 | 7/2015 |

OTHER PUBLICATIONS

Extended European Search Report dated May 3, 2022 in counterpart European Application No. 19860955.4.
International Preliminary Report on Patentability with translation of Written Opinion dated Mar. 9, 2021, in International Application No. PCT/JP2019/036157.
International Search Report of PCT/JP2019/036157 dated Oct. 29, 2019 [PCT/ISA/210].
Kumaki et al., "Water Based Barrier Agent for Food Packaging Paper: EXCEVAL™", 2014, vol. 68, No. 4, pp. 394-397 (4 pages total).

*Primary Examiner* — Mark Halpern
(74) *Attorney, Agent, or Firm* — Sughrue Mion, PLLC

(57) ABSTRACT

An oil-resistant agent for paper, which contains a non-fluorine copolymer that has a repeating unit formed from (a) an acrylic monomer having a long-chain hydrocarbon group with 7-40 carbon atoms and a repeating unit formed from (b) an acrylic monomer having a hydrophilic group. The oil-resistant agent for paper also contains a liquid medium that is composed of water and/or an organic solvent, preferably of water or a mixture (aqueous medium) of water and an organic solvent. The non-fluorine copolymer preferably has a repeating unit formed from (c) a monomer having an ion donor group in addition to the repeating units formed from the monomers (a) and (b). Also disclosed is an oil-resistant paper having an oil-resistant layer including the oil-resistant agent for paper, and starch or modified starch, on a surface of the paper as well as a method of treating paper.

20 Claims, 1 Drawing Sheet

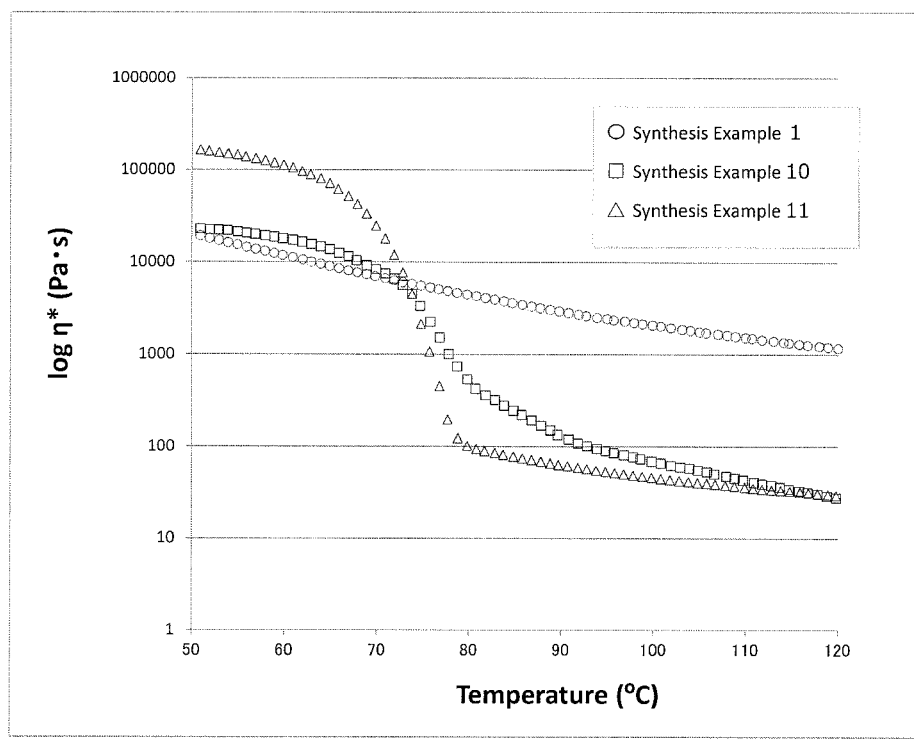

OIL-RESISTANT AGENT FOR PAPER

This is a Continuation Application under 37 C.F.R. § 1.53(b) of International Application No. PCT/JP2019/036157 filed Sep. 13, 2019, which claims priority from Japanese Patent Application Nos. 2018-172670 filed Sep. 14, 2018 and 2019-039667 filed Mar. 5, 2019. The above noted applications are incorporated herein by reference in their respective entireties.

TECHNICAL FIELD

The present disclosure relates to an oil-resistant agent for paper (a paper oil-resistant agent) and paper treated with the paper oil-resistant agent.

BACKGROUND ART

Food packaging materials and food containers made of paper are required to prevent water and oil contained in food from oozing out. Accordingly, an oil-resistant agent is internally or externally applied to the paper.

Patent Literature 1 (JP 2013-237941 A) discloses oil-resistant paper wherein an oil-resistant agent layer comprises starch, wax, and a styrene-acrylic resin having an alkyl (meth)acrylate group having 8 to 24 carbon atoms, the oil-resistant paper has an Oken air permeance of 2,000 seconds or less, and the oil-resistant agent layer has a solid content of 2.0 to 10.0 g/m².

Patent Literature 2 (WO 2013/008938 A1) discloses food packaging paper having a coating layer, wherein the coating layer is formed by applying a filler-containing aqueous varnish mainly composed of an acid-containing copolymer that is formed from one or more (meth)acrylate monomers and one or more vinyl monomers and that has a glass transition point of −10° C. to 50° C. to paper having a basis weight of 19 to 700 g/m² by a flexographic printing method, and then drying the paper.

Patent Literature 3 (JP 2006-028697 A) discloses oil-resistant paper for food, comprising an oil-resistant synthetic resin layer formed by applying a synthetic acrylic resin emulsion to a paper substrate, wherein the oil-resistant synthetic resin layer comprises an undercoat layer that is formed on the surface of the paper substrate and an overcoat layer that serves as a surface layer, the undercoat layer resin has a glass transition temperature $Tg_1$ of −30 to 0° C., and the overcoat layer resin has a glass transition temperature $Tg_2$ of 0 to 30° C.

CITATION LIST

Patent Literature

Patent Literature 1: JP 2013-237941 A
Patent Literature 2: WO 2013/008938 A1
Patent Literature 3: JP 2006-028697 A

SUMMARY OF INVENTION

Technical Problem

An object of the present disclosure is to provide an oil-resistant agent capable of imparting excellent oil resistance and water resistance to paper.

Solution to Problem

The present disclosure relates to a paper oil-resistant agent, comprising a fluorine-free copolymer having:

(a) a repeating unit formed from an acrylic monomer having a long-chain hydrocarbon group having 7 to 40 carbon atoms, and (b) a repeating unit formed from an acrylic monomer having a hydrophilic group.

The paper oil-resistant agent also comprises a liquid medium that is water and/or an organic solvent, preferably water or a mixture of water and an organic solvent (an aqueous medium).

The present disclosure provides oil-resistant paper treated with the paper oil-resistant agent. The treatment of the paper is external or internal. The oil-resistant paper has an oil-resistant layer comprising the paper oil-resistant agent and starch by a treatment method for externally adding the paper oil-resistant agent. Alternatively, the oil-resistant paper contains the paper oil-resistant agent in the inside of the paper by a treatment method for internally adding the paper oil-resistant agent.

Preferable embodiments of the present disclosure are as follows:

[1]

An oil-resistant agent for paper, comprising a fluorine-free copolymer having:

(a) a repeating unit formed from an acrylic monomer having a long-chain hydrocarbon group having 7 to 40 carbon atoms, and (b) a repeating unit formed from an acrylic monomer having a hydrophilic group.

[2]

The oil-resistant agent for paper according to [1], wherein the acrylic monomer having a long-chain hydrocarbon group (a) is a monomer represented by the formula:

$$CH_2=C(-X^1)-C(=O)-Y^1(R^1)_k$$

wherein
$R^1$ each is independently a hydrocarbon group having 7 to 40 carbon atoms,
$X^1$ is a hydrogen atom, a monovalent organic group, or a halogen atom,
$Y^1$ is a divalent to tetravalent group composed of at least one selected from a hydrocarbon group having one carbon atom, $-C_6H_4-$, $-O-$, $-C(=O)-$, $-S(=O)_2-$, or $-NH-$, provided that a hydrocarbon group is excluded, and
k is 1 to 3.

[3]

The oil-resistant agent for paper according to [1] or [2], wherein, in the acrylic monomer having a long-chain hydrocarbon group (a), $X^1$ is a hydrogen atom, and the long-chain hydrocarbon group has 18 to 40 carbon atoms.

[4]

The oil-resistant agent for paper according to [1] to [3], wherein the acrylic monomer having a long-chain hydrocarbon group (a) is:

(a1) an acrylic monomer represented by the formula:

$$CH_2=C(-X^4)-C(=O)-Y^2-R^2$$

wherein
$R^2$ is a hydrocarbon group having 7 to 40 carbon atoms,
$X^4$ is a hydrogen atom, a monovalent organic group, or a halogen atom, and
$Y^2$ is $-O-$ or $-NH-$, and/or (a2) an acrylic monomer represented by the formula:

$$CH_2=C(-X^5)-C(=O)-Y^3-Z(-Y^4-R^3)_n$$

wherein
R³ each is independently a hydrocarbon group having 7 to 40 carbon atoms,
X⁵ is a hydrogen atom, a monovalent organic group, or a halogen atom,
Y³ is —O— or —NH—,
Y⁴ each is independently a direct bond, or a group composed of at least one selected from —O—, —C(=O)—, —S(=O)₂—, or —NH—,
Z is a direct bond or a divalent or trivalent hydrocarbon group having 1 to 5 carbon atoms, and
n is 1 or 2; and
the acrylic monomer having a hydrophilic group (b) is at least one oxyalkylene (meth)acrylate represented by the formula:

$$CH_2=CX^2C(=O)-O-(RO)_n-X^3 \quad (b1)$$

and/or $$CH_2=CX^2C(=O)-O-(RO)_n-C(=O)CX^2=CH_2 \quad (b2)$$

wherein
X² is a hydrogen atom or a methyl group,
X³ is a hydrogen atom or an unsaturated or saturated hydrocarbon group having 1 to 22 carbon atoms,
R is an alkylene group having 2 to 6 carbon atoms, and
n is an integer of 1 to 90.

[5]
The oil-resistant agent for paper according to [2] or [4], wherein Y¹ or Y⁴ is a group represented by:
—Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—, or —Y'—R'—Y'—R'—
wherein
Y' each is independently a direct bond, —O—, —NH—, or —S(=O)₂—, and
R' is —(CH₂)ₘ— wherein m is an integer of 1 to 5, a linear hydrocarbon group having 1 to 5 carbon atoms and an unsaturated bond, a hydrocarbon group having 1 to 5 carbon atoms and a branched structure, or —(CH₂)ₗ—C₆H₄—(CH₂)ₗ— wherein l each is independently an integer of 0 to 5, and —C₆H₄— is a phenylene group.

[6]
The oil-resistant agent for paper according to [1] to [5], wherein the fluorine-free copolymer further comprises a repeating unit formed from (c) a monomer having an olefinic carbon-carbon double bond and having an anion-donating group or a cation-donating group, other than the monomers (a) and (b).

[7]
The oil-resistant agent for paper according to [6], wherein the anion-donating group is a carboxyl group, or the cation-donating group is an amino group.

[8]
The oil-resistant agent for paper according to [1] to [7], wherein an amount of the repeating unit formed from the acrylic monomer having a long-chain hydrocarbon group (a) is 30 to 95% by weight, based on the copolymer.

[9]
The oil-resistant agent for paper according to [1] to [8], wherein an amount of the repeating unit formed from the acrylic monomer having a long-chain hydrocarbon group (a) is 30 to 90% by weight, based on the copolymer, an amount of the repeating unit formed from the acrylic monomer having a hydrophilic group (b) is 5 to 70% by weight, based on the copolymer, an amount of the repeating unit formed from the monomer having an anion-donating group or a cation-donating group (c) is 0.1 to 30% by weight, based on the fluorine-free copolymer, and the fluorine-free copolymer is a random copolymer.

[10]
The oil-resistant agent for paper according to [1] to [9], wherein the fluorine-free copolymer has a melting point or a glass transition point of 20° C. or higher, and/or the fluorine-free copolymer has a dynamic viscoelasticity (a complex viscosity) of 10 to 5,000 Pa·s at 90° C.

[11]
The oil-resistant agent for paper according to [1] to [10], further comprising a liquid medium that is water or a mixture of water and an organic solvent.

[12]
Oil-resistant paper having an oil-resistant layer comprising the oil-resistant agent for paper according to [1] to [11], and starch or modified starch, on a surface of the paper.

[13]
The oil-resistant paper according to claim [12], wherein the oil-resistant agent for paper in the oil-resistant layer has a solid content of 2 g/m² or less.

[14]
Oil-resistant paper comprising the fluorine-free copolymer of the oil-resistant agent for paper according to [1] to [11] inside the paper.

[15]
The oil-resistant paper according to [12] to [14], which is a food packaging material or a food container.

[16]
A method of treating paper, comprising treating paper with the oil-resistant agent for paper according to [1] to [11] by an external application treatment or an internal application treatment.

Advantageous Effects of Invention

In the oil-resistant agent, the fluorine-free copolymer is favorably dispersed in an aqueous medium, particularly water.

The oil-resistant agent imparts high oil resistance and water resistance to paper.

BRIEF DESCRIPTION OF DRAWINGS

The FIGURE is a graph showing the complex viscosities of the fluorine-free copolymers of Synthesis Example 1, Synthesis Example 10, and Synthesis Example 11.

DESCRIPTION OF EMBODIMENT

The fluorine-free copolymer has:
(a) a repeating unit formed from an acrylic monomer having a long-chain hydrocarbon group having 7 to 40 carbon atoms, and
(b) a repeating unit formed from an acrylic monomer having a hydrophilic group.

Moreover, the fluorine-free copolymer preferably has a repeating unit formed from (c) a monomer having an ion-donating group in addition to the monomers (a) and (b).

The fluorine-free copolymer may have (d) a repeating unit formed from another monomer in addition to the monomers (a), (b) and (c).

(a) Acrylic Monomer Having Long-Chain Hydrocarbon Group

The acrylic monomer having a long-chain hydrocarbon group (a) has a long-chain hydrocarbon group having 7 to 40 carbon atoms. The long-chain hydrocarbon group having 7 to 40 carbon atoms is preferably a linear or branched hydrocarbon group having 7 to 40 carbon atoms. The number of carbon atoms of the long-chain hydrocarbon group is preferably 10 to 40, for example, 12 to 30, particularly 15 to 30. Alternatively, the number of carbon atoms of the long-chain hydrocarbon group may be 18 to 40.

The acrylic monomer having a long-chain hydrocarbon group (a) is preferably a monomer represented by the formula:

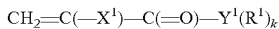
$$CH_2=C(-X^1)-C(=O)-Y^1(R^1)_k$$

wherein
- $R^1$ each is independently a hydrocarbon group having 7 to 40 carbon atoms,
- $X^1$ is a hydrogen atom, a monovalent organic group, or a halogen atom,
- $Y^1$ is a divalent to tetravalent group composed of at least one selected from a hydrocarbon group having one carbon atom (particularly, —$CH_2$—, —CH=), —$C_6H_4$—, —O—, —C(=O)—, —S(=O)$_2$—, or —NH—, provided that a hydrocarbon group is excluded, and
- k is 1 to 3.

$X^1$ may be a hydrogen atom, a methyl group, halogen excluding a fluorine atom, a substituted or unsubstituted benzyl group, or a substituted or unsubstituted phenyl group. Examples of X' include a hydrogen atom, a methyl group, a chlorine atom, a bromine atom, an iodine atom, and a cyano group. $X^1$ is preferably a hydrogen atom, a methyl group, or a chlorine atom. $X^1$ is particularly preferably a hydrogen atom.

$Y^1$ is a divalent to tetravalent group. $Y^1$ is preferably a divalent group.

$Y^1$ is preferably a group composed of at least one selected from a hydrocarbon group having one carbon atom, —$C_6H_4$—, —O—, —C(=O)—, —S(=O)$_2$—, or —NH—, provided that a hydrocarbon group is excluded. Examples of the hydrocarbon group having one carbon atom include —$CH_2$—, —CH= having a branched structure, and —C≡ having a branched structure.

$Y^1$ may be —Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—, or —Y'—R'—Y'—R'— wherein Y' is a direct bond, —O—, —NH—, or —S(=O)$_2$—, and R' is —$(CH_2)_m$— wherein m is an integer of 1 to 5, or —$C_6H_4$— (a phenylene group).

Specific examples of $Y^1$ include —O—, —NH—, —O—C(=O)—, —C(=O)—NH—, —NH—C(=O)—, —O—C(=O)—NH—, —NH—C(=O)—O—, —NH—C(=O)—NH—, —O—$C_6H_4$—, —O—$(CH_2)_m$—O—, —NH—$(CH_2)_m$—NH—, —O—$(CH_2)_m$—NH—, —NH—$(CH_2)_m$—O—, —O—$(CH_2)_m$—O—C(=O)—, —O—$(CH_2)_m$—C(=O)—O—, —NH—$(CH_2)_m$—O—C(=O)—, —NH—$(CH_2)_m$—C(=O)—O—, —O—$(CH_2)_m$—O—C(=O)—NH—, —O—$(CH_2)_m$—NH—C(=O)—O—, —O—$(CH_2)_m$—C(=O)—NH—, —O—$(CH_2)_m$—NH—C(=O)—, —O—$(CH_2)_m$—O—$C_6H_4$—, —O—$(CH_2)_m$—NH—S(=O)$_2$—, —O—$(CH_2)_m$—S(=O)$_2$—NH—, —NH—$(CH_2)_m$—O—C(=O)—NH—, —NH—$(CH_2)_m$—NH—C(=O)—O—, —NH—$(CH_2)_m$—C(=O)—NH—, —NH—$(CH_2)_m$—NH—C(=O)—, —NH—$(CH_2)_m$—O—$C_6H_4$—, —NH—$(CH_2)_m$—NH—$C_6H_4$—, —NH—$(CH_2)_m$—NH—S(=O)$_2$—, or —NH—$(CH_2)_m$—S(=O)$_2$—NH—, wherein m is 1 to 5, particularly 2 or 4.

$Y^1$ is preferably —O—, —NH—, —O—$(CH_2)_m$—O—C(=O)—, —O—$(CH_2)_m$—NH—C(=O)—, —O—$(CH_2)_m$—O—C(=O)—NH—, —O—$(CH_2)_m$—NH—C(=O)—O—, —O—$(CH_2)_m$—NH—C(=O)—NH—, —O—$(CH_2)_m$—NH—S(=O)$_2$—, —O—$(CH_2)_m$—S(=O)$_2$—NH—, —NH—$(CH_2)_m$—NH—S(=O)$_2$—, or —NH—$(CH_2)_m$—S(=O)$_2$—NH— wherein m is an integer of 1 to 5, particularly 2 or 4. $Y^1$ is more preferably —O— or —O—$(CH_2)_m$—NH—C(=O)—, particularly —O—$(CH_2)_m$—NH—C(=O)—.

$R^1$ is preferably a linear or branched hydrocarbon group. The hydrocarbon group may be particularly a linear hydrocarbon group. The hydrocarbon group is preferably an aliphatic hydrocarbon group, particularly a saturated aliphatic hydrocarbon group, especially an alkyl group. The number of carbon atoms of the hydrocarbon group is preferably 12 to 30, for example, 16 to 26 or 15 to 26, particularly 18 to 22 or 17 to 22.

Examples of the acrylic monomer having a long-chain hydrocarbon group (a) include:

(a1) an acrylic monomer represented by the formula:

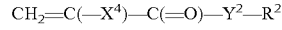
$$CH_2=C(-X^4)-C(=O)-Y^2-R^2$$

wherein
- $R^2$ is a hydrocarbon group having 7 to 40 carbon atoms,
- $X^4$ is a hydrogen atom, a monovalent organic group, or a halogen atom, and
- $Y^2$ is —O— or —NH—, and (a2) an acrylic monomer represented by the formula:

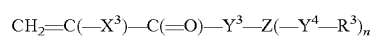
$$CH_2=C(-X^3)-C(=O)-Y^3-Z(-Y^4-R^3)_n$$

wherein
- $R^3$ each is independently a hydrocarbon group having 7 to 40 carbon atoms,
- $X^5$ is a hydrogen atom, a monovalent organic group, or a halogen atom,
- $Y^3$ is —O— or —NH—,
- $Y^4$ each is independently a group composed of at least one selected from a direct bond, —O—, —C(=O)—, —S(=O)$_2$—, or —NH—,
- Z is a divalent or trivalent hydrocarbon group having 1 to 5 carbon atoms, and
- n is 1 or 2.

(a1) Acrylic Monomer

The acrylic monomer (a1) is a compound represented by the formula:

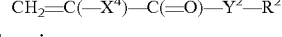
$$CH_2=C(-X^4)-C(=O)-Y^2-R^2$$

wherein
- $R^2$ is a hydrocarbon group having 7 to 40 carbon atoms,
- $X^4$ is a hydrogen atom, a monovalent organic group, or a halogen atom, and
- $Y^2$ is —O— or —NH—.

The acrylic monomer (a1) is a long-chain acrylate ester monomer wherein $Y^2$ is —O— or a long-chain acrylamide monomer wherein $Y^2$ is —NH—.

$R^2$ is preferably an aliphatic hydrocarbon group, particularly a saturated aliphatic hydrocarbon group, especially an alkyl group. In $R^2$, the number of carbon atoms of the hydrocarbon group is preferably 12 to 30, for example, 16 to 26, particularly 18 to 22.

$X^4$ may be a hydrogen atom, a methyl group, halogen excluding a fluorine atom, a substituted or unsubstituted benzyl group, or a substituted or unsubstituted phenyl group, and is preferably a hydrogen atom, a methyl group, or a chlorine atom.

Preferable specific examples of the long-chain acrylate ester monomer include lauryl (meth)acrylate, stearyl (meth)acrylate, icosyl (meth)acrylate, behenyl (meth)acrylate, stearyl α-chloroacrylate, icosyl α-chloroacrylate, and behenyl α-chloroacrylate.

Preferable specific examples of the long-chain acrylamide monomer include stearyl (meth)acrylamide, icosyl (meth)acrylamide, and behenyl (meth)acrylamide.

(a2) Acrylic Monomer

The acrylic monomer (a2) is a monomer different from the acrylic monomer (a1). The acrylic monomer (a2) is (meth)acrylate or (meth)acrylamide having a group composed of at least one selected from —O—, —C(=O)—, —S(=O)$_2$—, or —NH—.

The acrylic monomer (a2) may be a compound represented by the formula:

$$CH_2=C(-X^5)-C(=O)-Y^3-Z(-Y^4-R^3)_n$$

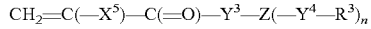

wherein
  $R^3$ each is independently a hydrocarbon group having 7 to 40 carbon atoms,
  $X^5$ is a hydrogen atom, a monovalent organic group, or a halogen atom,
  $Y^3$ is —O— or —NH—,
  $Y^4$ each is independently a direct bond, or a group composed of at least one selected from —O—, —C(=O)—, —S(=O)$_2$—, or —NH—,
  Z is a direct bond or a divalent or trivalent hydrocarbon group having 1 to 5 carbon atoms, and
  n is 1 or 2.

$R^3$ is preferably an aliphatic hydrocarbon group, particularly a saturated aliphatic hydrocarbon group, especially an alkyl group. In $R^3$, the number of carbon atoms of the hydrocarbon group is preferably 12 to 30, for example, 16 to 26 or 15 to 26, particularly 18 to 22 or 17 to 22.

$X^5$ may be a hydrogen atom, a methyl group, halogen excluding a fluorine atom, a substituted or unsubstituted benzyl group, or a substituted or unsubstituted phenyl group, and is preferably a hydrogen atom, a methyl group, or a chlorine atom.

$Y^4$ may be —Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—, or —Y'—R'—Y'—R'— wherein
  Y' each is independently a direct bond, —O—, —NH—, or —S(=O)$_2$—, and
  R' is —(CH$_2$)$_m$— wherein m is an integer of 1 to 5, a linear hydrocarbon group having 1 to 5 carbon atoms and an unsaturated bond, a hydrocarbon group having 1 to 5 carbon atoms and a branched structure, or —(CH$_2$)$_l$—C$_6$H$_4$—(CH$_2$)$_l$— wherein l each is independently an integer of 0 to 5, and —C$_6$H$_4$— is a phenylene group.

Specific examples of $Y^4$ include a direct bond, —O—, —NH—, —O—C(=O)—, —C(=O)—O—, —C(=O)—NH—, —NH—C(=O)—, —NH—S(=O)$_2$—, —S(=O)$_2$—NH—, —O—C(=O)—NH—, —NH—C(=O)—O—, —NH—C(=O)—NH—, —O—C$_6$H$_4$—, —NH—C$_6$H$_4$—, —O—(CH$_2$)$_m$—O—, —NH—(CH$_2$)$_m$—NH—, —O—(CH$_2$)$_m$—NH—, —NH—(CH$_2$)$_m$—O—, —O—(CH$_2$)$_m$—O—C(=O)—, —O—(CH$_2$)$_m$—C(=O)—O—, —NH—(CH$_2$)$_m$—O—C(=O)—, —NH—(CH$_2$)$_m$—C(=O)—O—, —O—(CH$_2$)$_m$—O—C(=O)—NH—, —O—(CH$_2$)$_m$—O—, —O—(CH$_2$)$_m$—C(=O)—NH—, —O—(CH$_2$)$_m$—NH—C(=O)—, —O—(CH$_2$)$_m$—NH—C(=O)—NH—, —O—(CH$_2$)$_m$—O—C$_6$H$_4$—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_4$—, —NH—(CH$_2$)$_m$—NH—C$_6$H$_4$— wherein m is an integer of 1 to 5.

$Y^4$ is preferably —O—, —NH—, —O—C(=O)—, —C(=O)—O—, —C(=O)—NH—, —NH—C(=O)—, —NH—S(=O)$_2$—, —S(=O)$_2$—NH—, —O—C(=O)—NH—, —NH—C(=O)—O—, —NH—C(=O)—NH—, or —O—C$_6$H$_4$—. $Y^4$ is more preferably —NH—C(=O)—, —C(=O)—NH—, —O—C(=O)—NH—, —NH—C(=O)—O—, or —NH—C(=O)—NH—.

Z is a direct bond or a divalent or trivalent hydrocarbon group having 1 to 5 carbon atoms, and may have a linear structure or a branched structure. The number of carbon atoms of Z is preferably 2 to 4, particularly 2. Specific examples of Z include a direct bond, —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, —CH$_2$CH= having a branched structure, —CH$_2$(CH—)CH$_2$— having a branched structure, —CH$_2$CH$_2$CH= having a branched structure, —CH$_2$CH$_2$CH$_2$CH$_2$CH= having a branched structure, —CH$_2$CH$_2$(CH—)CH$_2$— having a branched structure, and —CH$_2$CH$_2$CH$_2$CH= having a branched structure.

Z is preferably not a direct bond, and $Y^4$ and Z are simultaneously not direct bonds.

The acrylic monomer (a2) is preferably CH$_2$=C(—X$^5$)—C(=O)—O—(CH$_2$)$_m$—NH—C(=O)—R$^3$, CH$_2$=C(—X$^5$)—C(=O)—O—(CH$_2$)$_m$—O—C(=O)—NH—R$^3$, CH$_2$=C(—X$^5$)—C(=O)—O—(CH$_2$)$_m$—NH—C(=O)—O—R$^3$, or CH$_2$=C(—X$^5$)—C(=O)—O—(CH$_2$)$_m$—NH—C(=O)—NH—R$^3$, wherein R$^3$ and X$^5$ are as defined above.

The acrylic monomer (a2) is particularly preferably CH$_2$=C(—X$^5$)—C(=O)—O—(CH$_2$)$_m$—NH—C(=O)—R$^3$.

The acrylic monomer (a2) can be produced by reacting hydroxyalkyl (meth)acrylate or hydroxyalkyl (meth)acrylamide with long-chain alkyl isocyanate. Examples of the long-chain alkyl isocyanate include lauryl isocyanate, myristyl isocyanate, cetyl isocyanate, stearyl isocyanate, oleyl isocyanate, and behenyl isocyanate.

Alternatively, the acrylic monomer (a2) can also be produced by reacting (meth)acrylate having an isocyanate group in a side chain, for example, 2-methacryloyloxyethyl methacrylate, with long-chain alkylamine or long-chain alkyl alcohol. Examples of the long-chain alkylamine include laurylamine, myristylamine, cetylamine, stearylamine, oleylamine, and behenylamine. Examples of the long-chain alkyl alcohol include lauryl alcohol, myristyl alcohol, cetyl alcohol, stearyl alcohol, oleyl alcohol, and behenyl alcohol.

Preferable examples of the long-chain hydrocarbon group-containing acrylic monomer are as follows:
  stearyl (meth)acrylate, behenyl (meth)acrylate, stearyl α-chloroacrylate, behenyl α-chloroacrylate;
  stearyl (meth)acrylamide, behenyl (meth)acrylamide;

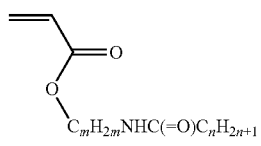
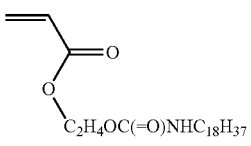

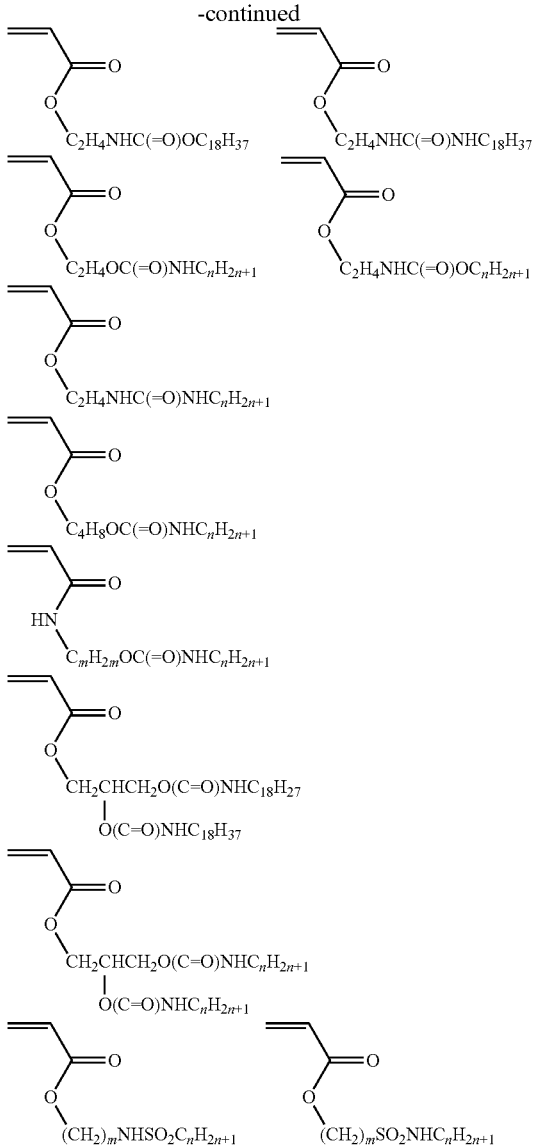

wherein n is a number of 7 to 40, and m is a number of 1 to 5.

The compounds of the above chemical formulae are acrylic compounds in which the α-position is a hydrogen atom, and specific examples may be methacrylic compounds in which the α-position is a methyl group and α-chloroacrylic compounds in which the α-position is a chlorine atom.

The melting point of the acrylic monomer having a long-chain hydrocarbon group (a) is preferably 10° C. or higher, more preferably 25° C. or higher.

The acrylic monomer having a long-chain hydrocarbon group (a) is preferably an acrylate in which $X'$, $X^4$, and $X^5$ are hydrogen atoms.

The acrylic monomer (a2) is preferably an amide group-containing monomer represented by the formula:

$$R^{12}\text{—}C(=O)\text{—}NH\text{—}R^{13}\text{—}O\text{—}R^{11}$$

wherein
$R^{11}$ is an organic residue having an ethylenically unsaturated polymerizable group,
$R^{12}$ is a hydrocarbon group having 7 to 40 carbon atoms, and
$R^{13}$ is a hydrocarbon group having 1 to 5 carbon atoms.

$R^{11}$ is an organic residue having an ethylenically unsaturated polymerizable group, and is not limited as long as there is a carbon-carbon double bond. Specific examples include organic residues having an ethylenically unsaturated polymerizable group such as —C(=O)CR$^{14}$=CH$_2$, —CHR$^{14}$=CH$_2$, and —CH$_2$CHR$^{14}$=CH$_2$, and R$^{14}$ is a hydrogen atom or an alkyl group having 1 to 4 carbon atoms. $R^{11}$ may have various organic groups other than the ethylenically unsaturated polymerizable group, e.g., organic groups such as chain hydrocarbons, cyclic hydrocarbons, polyoxyalkylene groups, and polysiloxane groups, and these organic groups may be substituted with various substituents. $R^{11}$ is preferably —C(=O)CR$^{14}$=CH$_2$.

$R^{12}$ is a hydrocarbon group having 7 to 40 carbon atoms and preferably an alkyl group, such as a chain hydrocarbon group or a cyclic hydrocarbon group. Among them, a chain hydrocarbon group is preferable, and a linear saturated hydrocarbon group is particularly preferable. The number of carbon atoms of $R^{12}$ is 7 to 40, preferably 11 to 27, and particularly preferably 15 to 23.

$R^{13}$ is a hydrocarbon group having 1 to 5 carbon atoms, and preferably an alkyl group. The hydrocarbon group having 1 to 5 carbon atoms may be either linear or branched, may have an unsaturated bond, and is preferably linear. The number of carbon atoms of $R^{13}$ is preferably 2 to 4, and particularly preferably 2. $R^{13}$ is preferably an alkylene group.

The amide group-containing monomer may be a monomer having one kind of $R^{12}$ (for example, a compound in which $R^{12}$ has 17 carbon atoms) or a monomer having a combination of multiple kinds of $R^{12}$ (for example, a mixture of a compound in which $R^{12}$ has 17 carbon atoms and a compound in which $R^{12}$ has 15 carbon atoms).

An example of the amide group-containing monomer is carboxylic acid amide alkyl (meth)acrylate.

Specific examples of the amide group-containing monomer include palmitic acid amide ethyl (meth)acrylate, stearic acid amide ethyl (meth)acrylate, behenic acid amide ethyl (meth)acrylate, myristic acid amide ethyl (meth)acrylate, lauric acid amide ethyl (meth)acrylate, isostearic acid ethylamide (meth)acrylate, oleic acid ethylamide (meth) acrylate, tert-butylcyclohexylcaproic acid amide ethyl (meth) acrylate, adamantanecarboxylic acid ethylamide (meth) acrylate, naphthalenecarboxylic acid amide ethyl (meth) acrylate, anthracenecarboxylic acid amide ethyl (meth)acrylate, palmitic acid amide propyl (meth)acrylate, stearic acid amide propyl (meth)acrylate, palmitic acid amide ethyl vinyl ether, stearic acid amide ethyl vinyl ether, palmitic acid amide ethyl allyl ether, stearic acid amide ethyl allyl ether, and mixtures thereof.

The amide group-containing monomer is preferably stearic acid amide ethyl (meth)acrylate. The amide group-containing monomer may be a mixture containing stearic acid amide ethyl (meth)acrylate. In a mixture containing stearic acid amide ethyl (meth)acrylate, the amount of stearic acid amide ethyl (meth)acrylate is, for example, 55 to 99% by weight, preferably 60 to 85% by weight, more preferably 65 to 80% by weight, based on the weight of the entirety of the amide group-containing monomer, and the remainder of the monomer may be, for example, palmitic acid amide ethyl (meth)acrylate.

(b) Acrylic Monomer Having Hydrophilic Group

The acrylic monomer having a hydrophilic group (b) is a monomer different from the monomer (a), and is a hydrophilic monomer. The hydrophilic group is preferably an oxyalkylene group (the number of carbon atoms of the alkylene group is 2 to 6). Particularly, the acrylic monomer having a hydrophilic group (b) is preferably polyalkylene glycol mono(meth)acrylate, polyalkylene glycol di(meth)acrylate, and/or polyalkylene glycol mono(meth)acrylamide. Polyalkylene glycol mono(meth)acrylate, polyalkylene glycol di(meth)acrylate, and polyalkylene glycol mono(meth)acrylamide are preferably those represented by general formulae:

$$CH_2=CX^2C(=O)-O-(RO)_n-X^3 \quad (b1)$$

$$CH_2=CX^2C(=O)-O-(RO)_n-C(=O)CX^2=CH_2 \quad (b2), \text{ and}$$

$$CH_2=CX^2C(=O)-NH-(RO)_n-X^3 \quad (b3)$$

wherein
$X^2$ each is independently a hydrogen atom or a methyl group,
$X^3$ each is independently a hydrogen atom or an unsaturated or saturated hydrocarbon group having 1 to 22 carbon atoms,
R is an alkylene group having 2 to 6 carbon atoms, and
n is an integer of 1 to 90. n may be, for example, 1 to 50, particularly 1 to 30, especially 1 to 15 or 2 to 15. Alternatively, n may be, for example, 1.

R may be a linear or branched alkylene group such as a group represented by the formula $-(CH_2)_x-$ or $-(CH_2)_{x1}-(CH(CH_3))_{x2}-$ wherein x1 and x2 are 0 to 6, for example, 2 to 5, and the sum of x1 and x2 is 1 to 6; and the order of $-(CH_2)_{x1}-$ and $-(CH(CH_3))_{x2}-$ is not limited to the formula shown, and may be random.

In $-(RO)_n-$, there may be two or more kinds (such as 2 to 4 kinds, particularly 2 kinds) of R, and thus $-(RO)_n-$ may be a combination of, for example, $-(R^1O)_{n1}-$ and $-(R^2O)_{n2}-$ wherein $R^1$ and $R^2$ are mutually different and an alkylene group having 2 to 6 carbon atoms, n1 and n2 are a number of 1 or more, and the sum of n1 and n2 is 2 to 90.

R in general formulae (b1), (b2), and (b3) is particularly preferably an ethylene group, a propylene group, or a butylene group. R in general formulae (b1), (b2), and (b3) may be a combination of two or more kinds of alkylene groups. In this case, at least one R is preferably an ethylene group, a propylene group, or a butylene group. Examples of the combination of R include a combination of ethylene group/propylene group, a combination of ethylene group/butylene group, and a combination of propylene group/butylene group. The monomer (b) may be a mixture of two or more kinds. In this case, in at least one monomer (b), R in general formula (b1), (b2), or (b3) is preferably an ethylene group, a propylene group, or a butylene group. Polyalkylene glycol di(meth)acrylate represented by general formula (b2) is not preferably used solely as the monomer (b), and is preferably used in combination with the monomer (b1). In this case as well, the compound represented by general formula (b2) is preferably less than 30% by weight in the monomer (b) used.

Specific examples of the acrylic monomer having a hydrophilic group (b) include, but are not limited to, the following.

$CH_2=CHCOO-CH_2CH_2O-H$
$CH_2=CHCOO-CH_2CH_2CH_2O-H$
$CH_2=CHCOO-CH_2CH(CH_3)O-H$
$CH_2=CHCOO-CH(CH_3)CH_2O-H$
$CH_2=CHCOO-CH_2CH_2CH_2CH_2O-H$
$CH_2=CHCOO-CH_2CH_2CH(CH_3)O-H$
$CH_2=CHCOO-CH_2CH(CH_3)CH_2O-H$
$CH_2=CHCOO-CH(CH_3)CH_2CH_2O-H$
$CH_2=CHCOO-CH_2CH(CH_2CH_3)O-H$
$CH_2=CHCOO-CH_2C(CH_3)_2O-H$
$CH_2=CHCOO-CH(CH_2CH_3)CH_2O-H$
$CH_2=CHCOO-C(CH_3)_2CH_2O-H$
$CH_2=CHCOO-CH(CH_3)CH(CH_3)O-H$
$CH_2=CHCOO-C(CH_3)(CH_2CH_3)O-H$
$CH_2=CHCOO-(CH_2CH_2O)_2-H$
$CH_2=CHCOO-(CH_2CH_2O)_4-H$
$CH_2=CHCOO-(CH_2CH_2O)_5-H$
$CH_2=CHCOO-(CH_2CH_2O)_6-H$
$CH_2=CHCOO-(CH_2CH_2O)_5-CH_3$
$CH_2=CHCOO-(CH_2CH_2O)_9-CH_3$
$CH_2=CHCOO-(CH_2CH_2O)_{23}-CH_3$
$CH_2=CHCOO-(CH_2CH_2O)_{90}-CH_3$
$CH_2=CHCOO-(CH_2CH(CH_3)O)_9-H$
$CH_2=CHCOO-(CH_2CH(CH_3)O)_9-CH_3$
$CH_2=CHCOO-(CH_2CH(CH_3)O)_{12}-CH_3$
$CH_2=CHCOO-(CH_2CH_2O)_5-(CH_2CH(CH_3)O)_2-H$
$CH_2=CHCOO-(CH_2CH_2O)_5-(CH_2CH(CH_3)O)_3-CH_3$
$CH_2=CHCOO-(CH_2CH_2O)_8-(CH_2CH(CH_3)O)_6-CH_2CH(C_2H_5)C_4H_9$
$CH_2=CHCOO-(CH_2CH_2O)_{23}-OOC(CH_3)C=CH_2$
$CH_2=CHCOO-(CH_2CH_2O)_{20}-(CH_2CH(CH_3)O)_5-CH_2-CH=CH_2$
$CH_2=CHCOO-(CH_2CH_2O)_9-H$
$CH_2=C(CH_3)COO-CH_2CH_2O-H$
$CH_2=C(CH_3)COO-CH_2CH_2CH_2O-H$
$CH_2=C(CH_3)COO-CH_2CH(CH_3)O-H$
$CH_2=C(CH_3)COO-CH(CH_3)CH_2O-H$
$CH_2=C(CH_3)COO-CH_2CH_2CH_2CH_2O-H$
$CH_2=C(CH_3)COO-CH_2CH_2CH(CH_3)O-H$
$CH_2=C(CH_3)COO-CH_2CH(CH_3)CH_2O-H$
$CH_2=C(CH_3)COO-CH(CH_3)CH_2CH_2O-H$
$CH_2=C(CH_3)COO-CH_2CH(CH_2CH_3)O-H$
$CH_2=C(CH_3)COO-CH_2C(CH_3)_2O-H$
$CH_2=C(CH_3)COO-CH(CH_2CH_3)CH_2O-H$
$CH_2=C(CH_3)COO-C(CH_3)_2CH_2O-H$
$CH_2=C(CH_3)COO-CH(CH_3)CH(CH_3)O-H$
$CH_2=C(CH_3)COO-C(CH_3)(CH_2CH_3)O-H$
$CH_2=C(CH_3)COO-(CH_2CH_2O)_2-H$
$CH_2=C(CH_3)COO-(CH_2CH_2O)_4-H$
$CH_2=C(CH_3)COO-(CH_2CH_2O)_5-H$
$CH_2=C(CH_3)COO-(CH_2CH_2O)_6-H$
$CH_2=C(CH_3)COO-(CH_2CH_2O)_9-H$
$CH_2=C(CH_3)COO-(CH_2CH_2O)_5-CH_3$
$CH_2=C(CH_3)COO-(CH_2CH_2O)_9-CH_3$
$CH_2=C(CH_3)COO-(CH_2CH_2O)_{23}-CH_3$
$CH_2=C(CH_3)COO-(CH_2CH_2O)_{90}-CH_3$
$CH_2=C(CH_3)COO-(CH_2CH(CH_3)O)_9-H$
$CH_2=C(CH_3)COO-(CH_2CH(CH_3)O)_9-CH_3$
$CH_2=C(CH_3)COO-(CH_2CH(CH_3)O)_{12}-CH_3$
$CH_2=C(CH_3)COO-(CH_2CH_2O)_5-(CH_2CH(CH_3)O)_2-H$
$CH_2=C(CH_3)COO-(CH_2CH_2O)_5-(CH_2CH(CH_3)O)_3-CH_3$
$CH_2=C(CH_3)COO-(CH_2CH_2O)_8-(CH_2CH(CH_3)O)_6-CH_2CH(C_2H_5)C_4H_9$
$CH_2=C(CH_3)COO-(CH_2CH_2O)_{23}-OOC(CH_3)C=CH_2$
$CH_2=C(CH_3)COO-(CH_2CH_2O)_{20}-(CH_2CH(CH_3O_5-CH_2-CH=CH_2$
$CH_2=CH-C(=O)-NH-CH_2CH_2O-H$
$CH_2=CH-C(=O)-NH-CH_2CH_2CH_2O-H$
$CH_2=CH-C(=O)-NH-CH_2CH(CH_3)O-H$ $CH_2=CH-C(=O)-NH-CH(CH_3)CH_2O-H$
$CH_2=CH-C(=O)-NH-CH_2CH_2CH_2CH_2O-H$
$CH_2=CH-C(=O)-NH-CH_2CH_2CH(CH_3)O-H$
$CH_2=CH-C(=O)-NH-CH_2CH(CH_3)CH_2O-H$
$CH_2=CH-C(=O)-NH-CH(CH_3)CH_2CH_2O-H$
$CH_2=CH-C(=O)-NH-CH_2CH(CH_2CH_3)O-H$
$CH_2=CH-C(=O)-NH-CH_2C(CH_3)_2O-H$
$CH_2=CH-C(=O)-NH-CH(CH_2CH_3)CH_2O-H$
$CH_2=CH-C(=O)-NH-C(CH_3)_2CH_2O-H$
$CH_2=CH-C(=O)-NH-CH(CH_3)CH(CH_3)O-H$
$CH_2=CH-C(=O)-NH-C(CH_3)(CH_2CH_3)O-H$
$CH_2=CH-C(=O)-NH-(CH_2CH_2O)_2-H$
$CH_2=CH-C(=O)-NH-(CH_2CH_2O)_4-H$
$CH_2=CH-C(=O)-NH-(CH_2CH_2O)_3-H$
$CH_2=CH-C(=O)-NH-(CH_2CH_2O)_6-H$
$CH_2=CH-C(=O)-NH-(CH_2CH_2O)_9-H$
$CH_2=CH-C(=O)-NH-(CH_2CH_2O)_5-CH_3$
$CH_2=CH-C(=O)-NH-(CH_2CH_2O)_9-CH_3$
$CH_2=CH-C(=O)-NH-(CH_2CH_2O)_{23}-CH_3$
$CH_2=CH-C(=O)-NH-(CH_2CH_2O)_{90}-CH_3$
$CH_2=CH-C(=O)-NH-(CH_2CH(CH_3)O)_9-H$
$CH_2=CH-C(=O)-NH-(CH_2CH(CH_3)O)_9-CH_3$
$CH_2=CH-C(=O)-NH-(CH_2CH(CH_3)O)_{12}-CH_3$
$CH_2=CH-C(=O)-NH-(CH_2CH_2O)_5-(CH_2CH(CH_3)O)_2-H$
$CH_2=CH-C(=O)-NH-(CH_2CH_2O)_5-(CH_2CH(CH_3)O)_3-CH_3$
$CH_2=CH-C(=O)-NH-(CH_2CH_2O)_8-(CH_2CH(CH_3)O)_6-CH_2CH(C_2H_5)C_4H_9$
$CH_2=C(CH_3)-C(=O)-NH-CH_2CH_2O-H$
$CH_2=C(CH_3)-C(=O)-NH-CH_2CH_2CH_2O-H$
$CH_2=C(CH_3)-C(=O)-NH-CH_2CH(CH_3)O-H$
$CH_2=C(CH_3)-C(=O)-NH-CH(CH_3)CH_2O-H$
$CH_2=C(CH_3)-C(=O)-NH-CH_2CH_2CH_2CH_2O-H$
$CH_2=C(CH_3)-C(=O)-NH-CH_2CH_2CH(CH_3)O-H$
$CH_2=C(CH_3)-C(=O)-NH-CH_2CH(CH_3)CH_2O-H$
$CH_2=C(CH_3)-C(=O)-NH-CH(CH_3)CH_2CH_2O-H$
$CH_2=C(CH_3)-C(=O)-NH-CH_2CH(CH_2CH_3)O-H$
$CH_2=C(CH_3)-C(=O)-NH-CH_2C(CH_3)_2O-H$
$CH_2=C(CH_3)-C(=O)-NH-CH(CH_2CH_3)CH_2O-H$
$CH_2=C(CH_3)-C(=O)-NH-C(CH_3)_2CH_2O-H$
$CH_2=C(CH_3)-C(=O)-NH-CH(CH_3)CH(CH_3)O-H$
$CH_2=C(CH_3)-C(=O)-NH-C(CH_3)(CH_2CH_3)O-H$
$CH_2=C(CH_3)-C(=O)-NH-(CH_2CH_2O)_2-H$
$CH_2=C(CH_3)-C(=O)-NH-(CH_2CH_2O)_4-H$
$CH_2=C(CH_3)-C(=O)-NH-(CH_2CH_2O)_3-H$
$CH_2=C(CH_3)-C(=O)-NH-(CH_2CH_2O)_6-H$
$CH_2=C(CH_3)-C(=O)-NH-(CH_2CH_2O)_9-H$
$CH_2=C(CH_3)-C(=O)-NH-(CH_2CH_2O)_5-CH_3$
$CH_2=C(CH_3)-C(=O)-NH-(CH_2CH_2O)_9-CH_3$
$CH_2=C(CH_3)-C(=O)-NH-(CH_2CH_2O)_{23}-CH_3$
$CH_2=C(CH_3)-C(=O)-NH-(CH_2CH_2O)_{90}-CH_3$
$CH_2=C(CH_3)-C(=O)-NH-(CH_2CH(CH_3)O)_9-H$
$CH_2=C(CH_3)-C(=O)-NH-(CH_2CH(CH_3)O)_9-CH_3$
$CH_2=C(CH_3)-C(=O)-NH-(CH_2CH(CH_3)O)_{12}-CH_3$
$CH_2=C(CH_3)-C(=O)-NH-(CH_2CH_2O)_5-(CH_2CH(CH_3)O)_2-H$
$CH_2=C(CH_3)-C(=O)-NH-(CH_2CH_2O)_5-(CH_2CH(CH_3)O)_3-CH_3$
$CH_2=C(CH_3)-C(=O)-NH-(CH_2CH_2O)_9-(CH_2CH(CH_3)O)_6-CH_2CH(C_2H_5)C_4H_9$

The monomer (b) is preferably acrylate or acrylamide in which $X^2$ is a hydrogen atom. Particularly, hydroxyethyl acrylate, hydroxypropyl acrylate, hydroxybutyl acrylate, or hydroxyethyl acrylamide is preferable.

(C) Monomer Having Ion-Donating Group

The monomer having an ion-donating group (c) is a monomer different from the monomer (a) and the monomer (b). The monomer (c) is preferably a monomer having an olefinic carbon-carbon double bond and an ion-donating group. The ion-donating group is an anion-donating group and/or a cation-donating group.

Examples of the monomer having an anion-donating group include monomers having a carboxyl group, a sulfonic acid group, or a phosphoric acid group. Specific examples of the monomer having an anion-donating group include (meth)acrylic acid, crotonic acid, maleic acid, fumaric acid, itaconic acid, citraconic acid, vinyl sulfonic acid, (meth)allylsulfonic acid, styrenesulfonic acid, phosphoric acid (meth)acrylate, vinylbenzenesulfonic acid, acrylamide tert-butyl sulfonic acid, and salts thereof.

Examples of salts of the anion-donating group include alkali metal salts, alkaline earth metal salts, and ammonium salts, such as a methyl ammonium salt, an ethanol ammonium salt, and a triethanol ammonium salt.

In the monomer having a cation-donating group, examples of the cation-donating group include an amino group and preferably a tertiary amino group and a quaternary amino group. In the tertiary amino group, two groups bonded to the nitrogen atom are the same or different and are preferably an aliphatic group having 1 to 5 carbon atoms (particularly an alkyl group), an aromatic group having 6 to 20 carbon atoms (an aryl group), or an araliphatic group having 7 to 25 carbon atoms (particularly an aralkyl group such as a benzyl group ($C_6H_5-CH_2-$)). In the quaternary amino group, three groups bonded to the nitrogen atom are the same or different and are preferably an aliphatic group having 1 to 5 carbon atoms (particularly an alkyl group), an aromatic group having 6 to 20 carbon atoms (an aryl group), or an araliphatic group having 7 to 25 carbon atoms (particularly an aralkyl group such as a benzyl group ($C_6H_5-CH_2-$)). In the tertiary and quaternary amino groups, the remaining one group bonded to the nitrogen atom may have a carbon-carbon double bond. The cation-donating group may be in the form of a salt.

A cation-donating group which is a salt is a salt formed with an acid (an organic acid or an inorganic acid). Organic acids such as carboxylic acids having 1 to 20 carbon atoms (particularly, monocarboxylic acids such as acetic acid, propionic acid, butyric acid, and stearic acid) are preferable. Dimethylaminoethyl (meth) acrylate, diethylaminoethyl (meth) acrylate, and salts thereof are preferable.

Specific examples of the monomer having a cation-donating group are as follows.

$CH_2=CHCOO-CH_2CH_2-N(CH_3)_2$ and salts thereof (such as acetate)
$CH_2=CHCOO-CH_2CH_2-N(CH_2CH_3)_2$ and salts thereof (such as acetate)
$CH_2=C(CH_3)COO-CH_2CH_2-N(CH_3)_2$ and salts thereof (such as acetate)
$CH_2=C(CH_3)COO-CH_2CH_2-N(CH_2CH_3)_2$ and salts thereof (such as acetate)
$CH_2=CHC(O)N(H)-CH_2CH_2CH_2-N(CH_3)_2$ and salts thereof (such as acetate)
$CH_2=CHCOO-CH_2CH_2-N(-CH_3)(-CH_2-C_6H_5)$ and salts thereof (such as acetate)
$CH_2=C(CH_3)COO-CH_2CH_2-N(-CH_2CH_3)(-CH_2-C_6H_5)$ and salts thereof (such as acetate)
$CH_2=CHCOO-CH_2CH_2-N^+(CH_3)_3Cl^-$
$CH_2=CHCOO-CH_2CH_2-N^+(-CH_3)_2(-CH_2-C_6H_5)Cl^-$
$CH_2=C(CH_3)COO-CH_2CH_2-N^+(CH_3)_3Cl^-$
$CH_2=CHCOO-CH_2CH(OH)CH_2-N^+(CH_3)_3Cl^-$ CH₂=C(CH₃)COO—CH₂CH(OH)CH₂—N⁺(CH₃)₃Cl⁻
CH₂=C(CH₃)COO—CH₂CH(OH)CH₂—N⁺(—CH₂CH₃)₂(—CH₂—C₆H₅)Cl⁻
CH₂=C(CH₃)COO—CH₂CH₂—N⁺(CH₃)₃Br⁻
CH₂=C(CH₃)COO—CH₂CH₂—N⁺(CH₃)₃I⁻
CH₂=C(CH₃)COO—CH₂CH₂—N⁺(CH₃)₃O⁻SO₃CH₃
CH₂=C(CH₃)COO—CH₂CH₂—N⁺(CH₃)(—CH₂—C₆H₅)₂Br⁻

The monomer having an ion-donating group (c) is preferably methacrylic acid, acrylic acid, and dimethylaminoethyl methacrylate, more preferably methacrylic acid and dimethylaminoethyl methacrylate.

(d) Another Monomer

Another monomer (d) is a monomer different from the monomers (a), (b), and (c). Examples of such another monomer include ethylene, vinyl acetate, vinyl chloride, vinyl fluoride, halogenated vinyl styrene, α-methylstyrene, p-methylstyrene, polyoxyalkylene mono(meth)acrylate, (meth)acrylamide, diacetone (meth)acrylamide, methylolated (meth)acrylamide, N-methylol (meth)acrylamide, alkyl vinyl ether, halogenated alkyl vinyl ether, alkyl vinyl ketone, butadiene, isoprene, chloroprene, glycidyl (meth) acrylate, aziridinyl (meth)acrylate, benzyl (meth)acrylate, isocyanate ethyl (meth)acrylate, cyclohexyl (meth) acrylate, isobornyl (meth) acrylate, short-chain alkyl (meth)acrylate, maleic anhydride, (meth)acrylate having a polydimethylsiloxane group, and N-vinylcarbazole.

The amount of the repeating unit formed from the monomer (a) (repeating unit (a)) may be 30 to 95% by weight or 30 to 90% by weight, preferably 40 to 88% by weight (or 45 to 95% by weight), more preferably 50 to 85% by weight, based on the fluorine-free copolymer (or based on the total of the repeating unit (a) and the repeating unit (b)).

The amount of the repeating unit formed from the monomer (b) (repeating unit (b)) may be 5 to 70% by weight or 10 to 70% by weight, preferably 8 to 50% by weight, more preferably 10 to 40% by weight, based on the fluorine-free copolymer (or based on the total of the repeating unit (a) and the repeating unit (b)).

The amount of the repeating unit formed from the monomer (c) may be 0.1 to 30% by weight, preferably 0.5 to 20% by weight, more preferably 1 to 15% by weight, based on the fluorine-free copolymer.

The amount of the repeating unit formed from the monomer (d) may be 0 to 20% by weight, for example, 1 to 15% by weight, particularly 2 to 10% by weight, based on the fluorine-free copolymer.

The weight-average molecular weight of the fluorine-free copolymer may be 1,000 to 1,000,000 or 10,000,000, preferably 5,000 to 800,000 or 8,000,000, more preferably 10,000 to 400,000 or 4,000,000. The weight-average molecular weight is a value obtained in terms of polystyrene by gel permeation chromatography.

Herein, "(meth)acryl" means acryl or methacryl. For example, "(meth)acrylate" means acrylate or methacrylate.

From the viewpoint of oil resistance, the fluorine-free copolymer is preferably a random copolymer rather than a block copolymer.

The melting point or the glass transition point of the fluorine-free copolymer is preferably 20° C. or higher, more preferably 30° C. or higher, and particularly preferably 35° C. or higher, for example, 40° C. or higher.

The dynamic viscoelasticity (the complex viscosity) of the fluorine-free copolymer at 90° C. is preferably 10 to 5,000 Pa·s, for example, 20 to 3,000 Pa·s, particularly 50 to 1,000 Pa·s. The dynamic viscoelasticity (the complex viscosity) of the fluorine-free copolymer at 70° C. is preferably 500 to 100,000 Pa·s, particularly 1,000 to 50,000 Pa·s. Also, the dynamic viscoelasticity (the complex viscosity) of the fluorine-free copolymer at 80 to 90° C. is preferably 10 to 5,000 Pa·s, for example, 20 to 3,000 Pa·s, particularly 50 to 1,000 Pa·s.

Polymerization for the fluorine-free copolymer is not limited, and various polymerization methods can be selected, such as bulk polymerization, solution polymerization, emulsion polymerization, and radiation polymerization. For example, in general, solution polymerization involving an organic solvent, and emulsion polymerization involving water or involving an organic solvent and water in combination, are selected. The fluorine-free copolymer after polymerization is diluted with water to be emulsified in water and thus formed into a treatment liquid.

Herein, it is preferable that after polymerization (for example, solution polymerization or emulsion polymerization, preferably solution polymerization), water is added, and then the solvent is removed to disperse the polymer in water. An emulsifier does not need to be added, and a self-dispersive product can be produced.

Examples of organic solvents include ketones such as acetone and methyl ethyl ketone, esters such as ethyl acetate and methyl acetate, glycols such as propylene glycol, dipropylene glycol monomethyl ether, N-methyl-2-pyrrolidone (NMP), dipropylene glycol, tripropylene glycol, and low molecular weight polyethylene glycol, and alcohols such as ethyl alcohol and isopropanol.

For example, peroxide, an azo compound, or a persulfate compound can be used as a polymerization initiator. The polymerization initiator is, in general, water-soluble and/or oil-soluble.

Specific examples of the oil-soluble polymerization initiator preferably include 2,2'-azobis(2-methylpropionitrile), 2,2'-azobis(2-methylbutyronitrile), 2,2'-azobis(2,4-dimethylvaleronitrile), 2,2'-azobis(2,4-dimethyl-4-methoxyvaleronitrile), 1,1'-azobis(cyclohexan-1-carbonitrile), dimethyl 2,2'-azobis(2-methylpropionate), 2,2'-azobis(2-isobutyronitrile), benzoyl peroxide, di-tert-butyl peroxide, lauryl peroxide, cumene hydroperoxide, t-butyl peroxypivalate, diisopropyl peroxydicarbonate, and t-butyl perpivalate.

Specific examples of the water-soluble polymerization initiator preferably include 2,2'-azobisisobutylamidine dihydrochloride, 2,2'-azobis(2-methylpropionamidine) hydrochloride, 2,2'-azobis[2-(2-imidazolin-2-yl)propane] hydrochloride, 2,2'-azobis[2-(2-imidazolin-2-yl)propane] sulfate hydrate, 2,2'-azobis[2-(5-methyl-2-imidazolin-2-yl)propane] hydrochloride, potassium persulfate, barium persulfate, ammonium persulfate, and hydrogen peroxide.

The polymerization initiator is used in the range of 0.01 to 5 parts by weight, based on 100 parts by weight of the monomers.

In order to regulate the molecular weight, a chain transfer agent such as a mercapto group-containing compound may be used, and specific examples thereof include 2-mercaptoethanol, thiopropionic acid, and alkyl mercaptan. The mercapto group-containing compound is used in the range of 10 parts by weight or less, or 0.01 to 5 parts by weight, based on 100 parts by weight of the monomers.

Specifically, the fluorine-free copolymer can be produced as follows.

In solution polymerization, a method is employed that involves dissolving the monomers in an organic solvent, performing nitrogen purge, then adding a polymerization initiator, and heating and stirring the mixture, for example, in the range of 40 to 120° C. for 1 to 10 hours. The polymerization initiator may be, in general, an oil-soluble polymerization initiator.

The organic solvent is inert to and dissolves the monomers, and examples include ketones such as acetone and methyl ethyl ketone, esters such as ethyl acetate and methyl acetate, glycols such as propylene glycol, dipropylene glycol monomethyl ether, N-methyl-2-pyrrolidone (NMP), dipropylene glycol, tripropylene glycol, and low molecular weight polyethylene glycol, alcohols such as ethyl alcohol and isopropanol, and hydrocarbon solvents such as n-heptane, n-hexane, n-octane, cyclohexane, methylcyclohexane, cyclopentane, methylcyclopentane, methylpentane, 2-ethylpentane, isoparaffin hydrocarbon, liquid paraffin, decane, undecane, dodecane, mineral spirit, mineral turpen, and naphtha. Preferable examples of the solvent include acetone, chloroform, HCHC 225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane, trichlorotrifluoroethane, N-methyl-2-pyrrolidone (NMP), and dipropylene glycol monomethyl ether (DPM). The organic solvent is used in the range of 50 to 2,000 parts by weight, for example, 50 to 1,000 parts by weight, based on total 100 parts by weight of the monomers.

In emulsion polymerization, a method is employed that involves emulsifying the monomers in water in the presence of an emulsifier, performing nitrogen purge, then adding a polymerization initiator, and stirring the mixture in the range of 40 to 80° C. for 1 to 10 hours for polymerization. The polymerization initiator may be a water-soluble polymerization initiator such as 2,2'-azobisisobutylamidine dihydrochloride, 2,2'-azobis(2-methylpropionamidine) hydrochloride, 2,2'-azobis[2-(2-imidazolin-2-yl)propane] hydrochloride, 2,2'-azobis[2-(2-imidazolin-2-yl)propane] sulfate hydrate, 2,2'-azobis[2-(5-methyl-2-imidazolin-2-yl)propane] hydrochloride, potassium persulfate, barium persulfate, ammonium persulfate, or hydrogen peroxide; or an oil-soluble polymerization initiator such as 2,2'-azobis(2-methylpropionitrile), 2,2'-azobis(2-methylbutyronitrile), 2,2'-azobis(2,4-dimethylvaleronitrile), 2,2'-azobis(2,4-dimethyl-4-methoxyvaleronitrile), 1,1'-azobis(cyclohexan-1-carbonitrile), dimethyl 2,2'-azobis(2-methylpropionate), 2,2'-azobis(2-isobutyronitrile), benzoyl peroxide, di-tert-butyl peroxide, lauryl peroxide, cumene hydroperoxide, t-butyl peroxypivalate, diisopropyl peroxydicarbonate, or t-butyl perpivalate. The polymerization initiator is used in the range of 0.01 to 10 parts by weight, based on 100 parts by weight of the monomers.

In order to obtain a water dispersion of the polymer, that has excellent stability when being left to stand, it is desirable that the monomers are formed into fine particles in water by using an emulsifying apparatus capable of applying strong crushing energy such as a high-pressure homogenizer or an ultrasonic homogenizer, and polymerized by using an oil-soluble polymerization initiator. Various anionic, cationic, or nonionic emulsifiers can be used as emulsifiers, and are used in the range of 0.5 to 20 parts by weight, based on 100 parts by weight of the monomers. An anionic and/or nonionic and/or cationic emulsifier is preferably used. When the monomers are not completely compatible, a compatibilizer such as a water-soluble organic solvent or a low molecular weight monomer that causes the monomers to be sufficiently compatible is preferably added. By adding a compatibilizer, emulsifiability and copolymerizability can be increased.

Examples of the water-soluble organic solvent include acetone, propylene glycol, dipropylene glycol monomethyl ether (DPM), dipropylene glycol, tripropylene glycol, ethanol, N-methyl-2-pyrrolidone (NMP), 3-methoxy-3-methyl-1-butanol, or isoprene glycol, and the water-soluble organic solvent may be used in the range of 1 to 50 parts by weight, for example, 10 to 40 parts by weight, based on 100 parts by weight of water. By adding NMP or DPM or 3-methoxy-3-methyl-1-butanol or isoprene glycol (a preferable amount is, for example, 1 to 20% by weight, and particularly 3 to 10% by weight, based on the composition), the stability of the composition (particularly, the emulsion) is increased. Examples of the low molecular weight monomer include methyl methacrylate, glycidyl methacrylate, and 2,2,2-trifluoroethyl methacrylate, and the low molecular weight monomer may be used in the range of 1 to 50 parts by weight, for example, 10 to 40 parts by weight, based on total 100 parts by weight of the monomers.

The oil-resistant agent is preferably in the form of a solution, an emulsion, or an aerosol. The oil-resistant agent contains the fluorine-free copolymer and a medium (for example, a liquid medium such as an organic solvent or water). The oil-resistant agent is preferably an aqueous dispersion of the fluorine-free copolymer. In the oil-resistant agent, the concentration of the fluorine-free copolymer may be, for example, 0.01 to 50% by weight. The oil-resistant agent preferably does not contain an emulsifier.

Removal of the organic solvent in the polymer solution can be performed by heating the polymer solution (for example, to 30° C. or higher such as 50 to 120° C.) (preferably under reduced pressure).

The oil-resistant agent can be used to treat (for example, to surface-treat) the paper substrate.

The oil-resistant agent can be applied to the treatment target by a conventionally known method. Usually, a method is employed in which the oil-resistant agent is diluted by being dispersed in an organic solvent or water, attached to the surface of the treatment target by a known method such as dip coating, spray coating, or foam coating, and then dried (surface treatment).

Examples of the treatment-target paper substrate include paper, a container made of paper, and a molded article made of paper (for example, molded pulp).

The fluorine-free copolymer of the present disclosure favorably adheres to the paper substrate.

Paper can be produced by a conventionally known papermaking method. An internal application treatment method in which the oil-resistant agent is added to a pulp slurry before papermaking, or an external application treatment method in which the oil-resistant agent is applied to paper after papermaking, can be used. The method of treatment with the oil-resistant agent in the present disclosure is preferably the external application treatment method.

Size presses for the external application treatment method can also be classified in accordance with the coating mode as follows.

One coating mode is a so-called pond-type two-roll size press in which a coating liquid (a sizing liquid) is supplied to a nip part formed when paper is passed between two rubber rolls to prepare a coating liquid reserve called a pond, and the paper is passed through this coating liquid reserve to apply the sizing liquid to both surfaces of the paper. Another coating mode is a gate roll-type size press and a rod metering size press in which the sizing liquid is applied by surface transfer. In the pond-type two-roll size press, the sizing liquid likely reaches the inside of paper, and in the surface transfer type, the sizing liquid components likely stay on the paper surface. With the surface transfer type, the coating layer more likely stays on the paper surface than with the pond-type two-roll size press, and a larger amount of the oil-resistant layer is formed on the surface than with the pond-type two-roll size press.

In the present disclosure, oil-resistant characteristics can be imparted to paper even when the former pond-type two-roll size press is used.

Paper thus treated, after rough drying at room temperature or high temperature, is optionally subjected to a heat treatment that can have a temperature range of up to 300° C., for example, up to 200° C., particularly 80° C. to 180° C., depending on the properties of the paper, and thus shows excellent oil resistance and water resistance.

The present disclosure can be used in gypsum board base paper, coated base paper, acid-free paper, commonly used liner and corrugating medium, neutral pure white roll paper, neutral liner, rustproof liner and metal laminated paper, kraft paper, and the like. The present disclosure can also be used in neutral printing writing paper, neutral coated base paper, neutral PPC paper, neutral heat sensitive paper, neutral pressure sensitive base paper, neutral inkjet paper, and neutral communication paper.

A pulp raw material may be any of bleached or unbleached chemical pulp such as kraft pulp or sulfite pulp, bleached or unbleached high yield pulp such as ground pulp, mechanical pulp, or thermomechanical pulp, and waste paper pulp such as waste newspaper, waste magazine, waste corrugated cardboard, or waste deinked paper. A mixture of the above pulp raw material and synthetic fiber of asbestos, polyamide, polyimide, polyester, polyolefin, polyvinyl alcohol, or the like can be used as well.

A sizing agent can be added to increase the water resistance of paper. Examples of the sizing agent include cationic sizing agents, anionic sizing agents, and rosin-based sizing agents (such as acidic rosin-based sizing agents and neutral rosin-based sizing agents). The amount of the sizing agent may be 0.01 to 5% by weight, based on the pulp.

If necessary, additives used in paper making, for example, a paper strength additive, such as starch, modified starch, carboxymethyl cellulose, and polyamide polyamine-epichlorohydrin resin; a flocculant, a fixing agent, a retention aid, a dye, a fluorescent dye, a slime control agent, and an antifoaming agent, can be used to such an extent that they are usually used as paper making chemicals. Starch and modified starch are preferably used.

If necessary, using starch, polyvinyl alcohol, a dye, a coating color, an antislip agent, or the like, the oil-resistant agent can be applied to paper by a size press, a gate roll coater, a bill blade coater, a calender, or the like.

In the external application, the amount of the fluorine-free copolymer contained in the oil-resistant layer is preferably 0.01 to 2.0 g/m$^2$, particularly 0.1 to 1.0 g/m$^2$. The oil-resistant layer is preferably formed from the oil-resistant agent together with starch and/or modified starch. The solid content of the oil-resistant agent in the oil-resistant layer is preferably 2 g/m$^2$ or less.

In the internal application, the oil-resistant agent and pulp are preferably mixed such that the amount of the oil-resistant agent is 0.01 to 50 parts by weight or 0.01 to 30 parts by weight, for example, 0.01 to 10 parts by weight, particularly 0.2 to 5.0 parts by weight, based on 100 parts by weight of pulp which forms paper.

In the external and internal applications, the weight ratio of starch and modified starch to the fluorine-free copolymer may be 10:90 to 98:2.

In the external application, oil resistance can be imparted to paper also by using a so-called pond-type two-roll size press treatment in which the treatment liquid is stored between rolls, and base paper is passed through the treatment liquid between the rolls at a given roll speed and nip pressure.

The non-fluorinated copolymer may be nonionic, cationic, anionic, or amphoteric. In the external application treatment, the paper substrate may contain an additive such as a sizing agent, a paper strength additive, a flocculant, a retention aid, or a coagulant. The additive may be nonionic, cationic, anionic, or amphoteric. The ionic charge density of the additive may be −10,000 to 10,000 μeq/g, preferably −4,000 to 8,000 μeq/g, more preferably −1,000 to 7,000 μeq/g. Additives (solids or active components) such as a sizing agent, a paper strength additive, a flocculant, a retention aid, or a coagulant can be used, in general, in an amount of 0.1 to 10% by weight (for example, 0.2 to 5.0% by weight), based on the pulp. In the case of a paper substrate containing a cationic additive (such as a sizing agent, a paper strength additive, a flocculant, a retention aid, or a coagulant), the oil-resistant agent is preferably anionic.

In the internal application treatment, a pulp slurry having a pulp concentration of 0.5 to 5.0% by weight (for example, 2.5 to 4.0% by weight) is preferably formed into paper. An additive (such as a sizing agent, a paper strength additive, a flocculant, a retention aid, or a coagulant) and the fluorine-free copolymer can be added to the pulp slurry. Since pulp is generally anionic, at least one of the additive and the fluorine-free copolymer is preferably cationic or amphoteric such that the additive and the fluorine-free copolymer are favorably anchored to paper. A combination of a cationic or amphoteric additive and an anionic fluorine-free copolymer, a combination of an anionic additive and a cationic or amphoteric fluorine-free copolymer, and a combination of a cationic or amphoteric additive and fluorine-free copolymer are preferably used. Paper is made more preferably at an ionic charge density of the additive constituting a sizing agent, a paper strength additive, a flocculant, a retention aid, or a coagulant being −1,000 to 7,000 μeq/g, and paper is made more preferably at an ionic charge density of 100 to 1,000 μeq/g (for example, 330 μeq/g, 420 μeq/g, or 680 μeq/g).

Examples of the additive (such as a sizing agent, a paper strength additive, a flocculant, a retention aid, or a coagulant) include alkyl ketene dimer, alkenyl succinic anhydride, a styrenic polymer (a styrene/maleic acid polymer, a styrene/acrylic acid polymer), a urea-formaldehyde polymer, polyethyleneimine, a melamine-formaldehyde polymer, a polyamideamine-epichlorohydrin polymer, a polyacrylamide polymer, a polyamine-type polymer, polydiallyldimethylammonium chloride, an alkylamine-epichlorohydrin condensate, a condensate of alkylene dichloride and polyalkylene polyamine, a dicyandiamide-formalin condensate, a dimethyldiallylammonium chloride polymer, and an olefin/maleic anhydride polymer.

In the present disclosure, the treatment target is treated with the oil-resistant agent. The "treatment" means that the oil-resistant agent is applied to the treatment target by dipping, spraying, coating, or the like. By the treatment, the fluorine-free copolymer, which is the active component of the oil-resistant agent, reaches the inside of the treatment target and/or adheres to the surface of the treatment target.

EXAMPLES

Next, the present disclosure will now be described in detail by way of Examples, Comparative Examples, and Test Examples. However, the description of these does not limit the present disclosure.

Below, a part, %, and a ratio indicate a part by weight, % by weight, and a weight ratio, respectively, unless otherwise specified.

The test methods used below are as follows.

Dynamic Viscoelasticity (Complex Viscosity)

A water dispersion of a fluorine-free copolymer was dried in an oven at about 130° C. for 30 minutes to obtain a measurement sample copolymer. The complex viscosity (H*) of the copolymer was measured at a temperature-increasing rate of 1° C./min by a dynamic viscoelasticity analyzer RHEOSOL-G3000 (manufactured by UBM).

Measurement of Weight-Average Molecular Weight

The weight-average molecular weight of the fluorine-free copolymer (in terms of polystyrene) was determined by GPC (gel permeation chromatography).

Oil Resistance (KIT)

Oil resistance (the KIT method) was measured in accordance with TAPPI T-559 cm-02. The KIT test liquid is a test liquid obtained by mixing castor oil, toluene, and heptane in a ratio shown in Table 1. One droplet of a test liquid shown in Table 1 was placed on paper, and the state of oil penetration was observed after 15 seconds. The highest point of oil-resistance degree provided by the KIT test liquid that showed no penetration was regarded as oil resistance. The greater the number of the KIT test liquid, the higher the oil resistance.

TABLE 1

| Oil-resistance degree (KIT test liquid) | Mixing ratio (vol %) | | |
|---|---|---|---|
| | Castor oil | Toluene | Heptane |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 45 | 55 |
| 12 | 0 | 50 | 50 |

Water Resistance (Cobb Value)

Water resistance (Cobb value) was measured in accordance with JIS P 8140.

The weight (g) of water absorbed in 1 minute by 100 square centimeters of paper that supported water having a height of 1 centimeter was measured, and the value thereof was converted to the weight per square meter (g/m$^2$).

Oil Resistance (Practical Oil Test 1)

About 1 g of commercially available olive oil was dripped onto an obtained paper plate or treated paper (the treated paper weighed about 0.1 g) and left to stand at room temperature (20° C.) for 15 minutes, and then the extent of penetration to the underside of the paper plate or the treated paper was observed. The evaluation values were set according to the extent of penetration to the underside as follows.

5: 0 to 5%
4: 6 to 20%
3: 21 to 50%
2: 51 to 75%
1: 76 to 100%

Oil Resistance (Practical Oil Test 2)

Evaluations were made by the same method as in Practical Oil Test 1 except that the treated paper or the paper plate onto which olive oil was dripped in Practical Oil Test 1 was placed in an oven at 70° C. and taken out after 7 minutes to observe the extent of penetration.

Synthesis Example 1

A reactor having a volume of 500 ml and equipped with a stirrer, a thermometer, a reflux condenser, a dropping funnel, a nitrogen inlet, and a heater was provided, and 100 parts of a methyl ethyl ketone (MEK) solvent was added. Subsequently, while the solvent is stirred, a monomer consisting of 78 parts of stearyl acrylate (StA, melting point: 30° C.), 16 parts of hydroxyethyl acrylate (HEA), and 6 parts of methacrylic acid (MAA) (the monomer being 100 parts in total) as well as 1.2 parts of a perbutyl PV (PV) initiator were added in this order, and the mixture was mixed by being stirred for 12 hours in a nitrogen atmosphere at 65 to 75° C. to carry out copolymerization. The solid content concentration of the resulting copolymer-containing solution was 50% by weight. When the molecular weight of the resulting copolymer was analyzed by gel permeation chromatography, the weight-average molecular weight in terms of polystyrene was 230,000.

As a post-treatment, 142 g of a 0.3% aqueous NaOH solution was added to 50 g of the resulting copolymer solution and dispersed, then MEK was distilled off under reduced pressure while heating the mixture by using an evaporator, and thus a milky white water dispersion of a copolymer was obtained (the content of the volatile organic solvent was 1% by weight or less). Moreover, ion-exchanged water was added to the water dispersion, and thus a water dispersion having a solid content concentration of 15% by weight was obtained.

The melting point of the copolymer was 48° C.

The complex viscosity of the copolymer was measured. The result is shown in the FIGURE.

The copolymer was dissolved in chloroform and spin-coated onto a PET film, and when the contact angle of the air-dried surface was measured, the contact angle with respect to water was 108°, and the contact angle with respect to n-hexadecane was 57 to 59°.

Synthesis Example 2

A reactor having a volume of 500 ml and equipped with a stirrer, a thermometer, a reflux condenser, a dropping funnel, a nitrogen inlet, and a heater was provided, and 100 parts of a methyl ethyl ketone (MEK) solvent was added. Subsequently, while the solvent is stirred, a monomer consisting of 78 parts of stearyl acrylate (StA, melting point: 30° C.), 16 parts of hydroxyethyl acrylate (HEA), and 6 parts of dimethylaminoethyl methacrylate (DM) (the monomer being 100 parts in total) as well as 1.2 parts of a perbutyl PV (PV) initiator were added in this order, and mixed by being stirred for 12 hours in a nitrogen atmosphere at 65 to 75° C. to carry out copolymerization. The solid content concentration of the resulting copolymer-containing solution was 50% by weight.

As a post-treatment, 142 g of a 0.4% aqueous acetic acid solution was added to 50 g of the resulting copolymer solution and dispersed, then the mixture was heated by using an evaporator to distilled off MEK under reduced pressure, and thus a milky white water dispersion of a copolymer was obtained (the content of the volatile organic solvent was 1% by weight or less). Moreover, ion-exchanged water was added to the water dispersion, and thus a water dispersion having a solid content concentration of 15% by weight was obtained.

The copolymer was dissolved in chloroform and spin-coated onto a PET film, and when the contact angle of the air-dried surface was measured, the contact angle with respect to water was 106°, and the contact angle with respect to n-hexadecane was 62°.

Synthesis Example 3

Copolymerization and post-treatment were performed in the same manner as in Synthesis Example 2 except that StA and HEA as used in Synthesis Example 2 were used in an amount of 60 parts and 34 parts, respectively, and thus an aqueous dispersion having a solid content concentration of 15% by weight was obtained.

Synthesis Example 4

Copolymerization and post-treatment were performed in the same manner as in Synthesis Example 1 except that 6 parts of acrylic acid (AA) was used in place of methacrylic acid (MAA) of Synthesis Example 1, and thus a water dispersion having a solid content concentration of 15% by weight was obtained.

Synthesis Example 5

Copolymerization and post-treatment were performed in the same manner as in Synthesis Example 1 except that 16 parts of hydroxyethyl methacrylate (HEMA) was used in place of hydroxyethyl acrylate (HEA) of Synthesis Example 1, and thus a water dispersion having a solid content concentration of 15% by weight was obtained.

The copolymer was dissolved in chloroform and spin-coated onto a PET film, and when the contact angle of the air-dried surface was measured, the contact angle with respect to water was 102°, and the contact angle with respect to n-hexadecane was 48°.

Synthesis Example 6

Copolymerization and post-treatment were performed in the same manner as in Synthesis Example 1 except that 78 parts of lauryl methacrylate (LMA, melting point: −7° C.) was used in place of StA of Synthesis Example 1, and thus an aqueous dispersion having a solid content concentration of 15% by weight was obtained.

Synthesis Example 7

Copolymerization and post-treatment were performed in the same manner as in Synthesis Example 1 except that 78 parts of stearyl methacrylate (StMA, melting point: 18° C.) was used in place of StA of Synthesis Example 1, and thus an aqueous dispersion having a solid content concentration of 15% by weight was obtained.

Synthesis Example 8

Copolymerization and post-treatment were performed in the same manner as in Synthesis Example 1 except that 78 parts of stearic acid amide ethyl acrylate (C18AmEA, melting point: 70° C.) was used in place of StA of Synthesis Example 1, and thus an aqueous dispersion having a solid content concentration of 15% by weight was obtained.

Synthesis Example 9

Copolymerization and post-treatment were performed in the same manner as in Synthesis Example 8 except that 39 parts of C18AmEA of Synthesis Example 8 and 39 parts of StA were used in place of 78 parts of StA of Synthesis Example 1, and thus an aqueous dispersion having a solid content concentration of 15% by weight was obtained.

Synthesis Example 10

Copolymerization and post-treatment were performed in the same manner as in Synthesis Example 8 except that 6 parts of DM was used in place of MAA of Synthesis Example 8, and thus a water dispersion having a solid content concentration of 15% by weight was obtained.

The melting point of the copolymer was 64° C.

The complex viscosity of the copolymer was measured. The result is shown in the FIGURE.

Synthesis Example 11

Copolymerization and post-treatment were performed in the same manner as in Synthesis Example 10 except that 16 parts of hydroxybutyl acrylate (HBA, Tg: −40° C.) was used in place of HEA of Synthesis Example 10, and thus an aqueous dispersion having a solid content concentration of 15% by weight was obtained.

The melting point of the copolymer was 66° C.

The complex viscosity of the copolymer was measured. The result is shown in the FIGURE.

Synthesis Example 12

Copolymerization and post-treatment were performed in the same manner as in Synthesis Example 11 except that C18AmEA and HBA as used in Synthesis Example 11 were used in an amount of 49 parts and 27 parts, respectively, and thus an aqueous dispersion having a solid content concentration of 15% by weight was obtained.

Comparative Synthesis Example 1

Copolymerization and post-treatment were performed in the same manner as in Synthesis Example 1 except that 78 parts of methyl methacrylate (MMA, melting point: −48° C.) was used in place of StA of Synthesis Example 1, and thus an aqueous dispersion having a solid content concentration of 15% by weight was obtained.

Comparative Synthesis Example 2

Copolymerization and post-treatment were performed in the same manner as in Synthesis Example 1 except that 16 parts of N-vinylpyrrolidone (NVP) was used in place of HEA of Synthesis Example 2, and thus an aqueous dispersion having a solid content concentration of 15% by weight was obtained.

Comparative Synthesis Example 3

Copolymerization and post-treatment were performed in the same manner as in Synthesis Example 1 except that 78 parts of tert-butyl methacrylate (TBMA, melting point: −60°

C.) was used in place of StA of Synthesis Example 1, and thus an aqueous dispersion having a solid content concentration of 15% by weight was obtained.

[Evaluation in External Application Method]

Example 1

As wood pulp, a pulp slurry was prepared that had a weight ratio of LBKP (leaf bleached kraft pulp) and NBKP (needle bleached kraft pulp) of 60% by weight and 40% by weight and a pulp freeness (Canadian Standard Freeness) of 400 ml, a paper wet strength additive and a sizing agent were added to this pulp slurry, and paper having a paper density of 0.58 g/cm$^3$ and a basis weight of 45 g/m$^2$ made by a fourdrinier paper machine was used as base paper for an external application treatment (a size press treatment). This base paper had a oil resistance (a KIT value) of 0 and a water resistance (a Cobb value) of 52 g/m$^2$.

Using the water dispersion of copolymer obtained in Synthesis Example 1 as an oil-resistant agent, oil-resistant paper (processed paper) was obtained according to the following formulation. The treatment liquid was prepared such that the solid content concentration of the water dispersion of copolymer obtained in Synthesis Example 1 was 2.4% by weight and the solid content concentration of starch was 7%, treated by a size press, and then dried by a drum dryer, and thus oil-resistant paper (processed paper) was obtained. The amount of solids of the applied starch and copolymer in the resulting oil-resistant paper was 1.1 g/m$^2$ (the amount of the applied copolymer was 0.28 g/m$^2$). Using the resulting base paper as test paper, the above-described Kit test was performed. The evaluation results are shown in Table 2.

Starch was commonly-used hydroxyethylated starch (Penford 290: manufactured by Penford). As for the size press treatment (using a size press machine manufactured by Mathis), a so-called pond-type two-roll size press treatment was used in which the treatment liquid was stored between rolls, and the base paper was passed through the treatment liquid between rolls at a given roll speed and nip pressure.

Example 2

The same treatment as in Example 1 was performed except that the copolymer of Synthesis Example 2 was used. The amount of solids of the applied starch and copolymer in the resulting oil-resistant paper was 1.1 g/m$^2$ (the amount of the applied copolymer was 0.28 g/m$^2$). The results are shown in Table 2.

Example 3

The same treatment as in Example 1 was performed except that the copolymer of Synthesis Example 3 was used. The amount of solids of the applied starch and copolymer in the resulting oil-resistant paper was 1.1 g/m$^2$ (the amount of the applied copolymer was 0.28 g/m$^2$). The results are shown in Table 2.

Example 4

The same treatment as in Example 1 was performed except that the copolymer of Synthesis Example 4 was used. The amount of solids of the applied starch and copolymer in the resulting oil-resistant paper was 1.1 g/m$^2$ (the amount of the applied copolymer was 0.28 g/m$^2$). The results are shown in Table 2.

Example 5

The same treatment as in Example 1 was performed except that the copolymer of Synthesis Example 5 was used. The amount of solids of the applied starch and copolymer in the resulting oil-resistant paper was 1.1 g/m$^2$ (the amount of the applied copolymer was 0.28 g/m$^2$). The results are shown in Table 2.

Example 6

The same treatment as in Example 1 was performed except that the copolymer of Synthesis Example 6 was used. The amount of solids of the applied starch and copolymer in the resulting oil-resistant paper was 1.1 g/m$^2$ (the amount of the applied copolymer was 0.28 g/m$^2$). The results are shown in Table 2.

Example 7

The same treatment as in Example 1 was performed except that the copolymer of Synthesis Example 7 was used. The amount of solids of the applied starch and copolymer in the resulting oil-resistant paper was 1.1 g/m$^2$ (the amount of the applied copolymer was 0.28 g/m$^2$). The results are shown in Table 2.

Example 8

The same treatment as in Example 1 was performed except that the copolymer of Synthesis Example 8 was used. The amount of solids of the applied starch and copolymer in the resulting oil-resistant paper was 1.1 g/m$^2$ (the amount of the applied copolymer was 0.28 g/m$^2$). The results are shown in Table 3.

Example 9

The same treatment as in Example 1 was performed except that the copolymer of Synthesis Example 9 was used. The amount of solids of the applied starch and copolymer in the resulting oil-resistant paper was 1.1 g/m$^2$ (the amount of the applied copolymer was 0.28 g/m$^2$). The results are shown in Table 3.

Example 10

The same treatment as in Example 1 was performed except that the copolymer of Synthesis Example 10 was used. The amount of solids of the applied starch and copolymer in the resulting oil-resistant paper was 1.1 g/m$^2$ (the amount of the applied copolymer was 0.28 g/m$^2$). The results are shown in Table 3.

Example 11

The same treatment as in Example 1 was performed except that the copolymer of Synthesis Example 10 was used, and the treatment liquid was prepared such that the solid content concentration of starch was 14%. The amount of solids of the applied starch and copolymer in the resulting oil-resistant paper was 2.2 g/m$^2$ (the amount of the applied copolymer was 0.32 g/m$^2$). The results are shown in Table 3.

Example 12

The same treatment as in Example 1 was performed except that the copolymer of Synthesis Example 11 was used. The amount of solids of the applied starch and copolymer in the resulting oil-resistant paper was 1.1 g/m² (the amount of the applied copolymer was 0.28 g/m²). The results are shown in Table 3.

Example 13

The same treatment as in Example 1 was performed except that the copolymer of Synthesis Example 12 was used. The amount of solids of the applied starch and copolymer in the resulting oil-resistant paper was 1.1 g/m² (the amount of the applied copolymer was 0.28 g/m²). The results are shown in Table 3.

Comparative Example 1

The same treatment as in Example 1 was performed except that the copolymer was not used, and starch was used alone. The amount of solids of the applied starch and copolymer in the resulting oil-resistant paper was 1.0 g/m² (the amount of the applied copolymer was 0.0 g/m²). The results are shown in Table 4.

Comparative Example 2

The same treatment as in Example 1 was performed except that the copolymer of Comparative Synthesis Example 1 was used. The amount of solids of the applied starch and copolymer in the resulting oil-resistant paper was 1.1 g/m² (the amount of the applied copolymer was 0.28 g/m²). The results are shown in Table 4.

Comparative Example 3

The same treatment as in Example 1 was performed except that the copolymer of Comparative Synthesis Example 2 was used. The amount of solids of the applied starch and copolymer in the resulting oil-resistant paper was 1.1 g/m² (the amount of the applied copolymer was 0.28 g/m²). The results are shown in Table 4.

Comparative Example 4

The same treatment as in Example 1 was performed except that the copolymer of Comparative Synthesis Example 3 was used. The amount of solids of the applied starch and copolymer in the resulting oil-resistant paper was 1.1 g/m² (the amount of the applied copolymer was 0.28 g/m²). The results are shown in Table 4.

TABLE 2

| | | Ex. 1 | Ex. 2 | Ex. 3 | Ex. 4 | Ex. 5 | Ex. 6 | Ex. 7 |
|---|---|---|---|---|---|---|---|---|
| Copolymer Monomer ingredients (pbw) | Copolymer No. | Syn. Ex. 1 | Syn. Ex. 2 | Syn. Ex. 3 | Syn. Ex. 4 | Syn. Ex. 5 | Syn. Ex. 6 | Syn. Ex. 7 |
| | StA | 78 | 78 | 60 | 78 | 78 | | |
| | StMA | | | | | | | 78 |
| | LMA | | | | | | 78 | |
| | HEA | 16 | 16 | 34 | 16 | | 16 | 16 |
| | HEMA | | | | | 16 | | |
| | MAA | 6 | | | | 6 | 6 | 6 |
| | AA | | | | 6 | | | |
| | DM | | 6 | 6 | | | | |
| Dry coating amount (g/m²) | Total amount | 1.1 | 1.1 | 1.1 | 1.1 | 1.1 | 1.1 | 1.1 |
| | Copolymer | 0.28 | 0.28 | 0.28 | 0.28 | 0.28 | 0.28 | 0.28 |
| Dry coating amount (solid %/pulp) | Total amount | 2.4 | 2.4 | 2.4 | 2.4 | 2.4 | 2.4 | 2.4 |
| | Copolymer | 0.6 | 0.6 | 0.6 | 0.6 | 0.6 | 0.6 | 0.6 |
| Oil resistance | KIT value | 4 | 4 | 4 | 3 | 3 | 2 | 2 |
| Water resistance | Cobb value | 18 | 14 | 17 | 17 | 19 | 16 | 19 |

TABLE 3

| | | Ex. 8 | Ex. 9 | Ex. 10 | Ex. 11 | Ex. 12 | Ex. 13 |
|---|---|---|---|---|---|---|---|
| Copolymer Monomer ingredients (pbw) | Copolymer No. | Syn. Ex. 8 | Syn. Ex. 9 | Syn. Ex. 10 | Syn. Ex. 10 | Syn. Ex. 11 | Syn. Ex. 12 |
| | StA | | 39 | | | | |
| | C18AmEA | 78 | 39 | 78 | 78 | 78 | 49 |
| | HEA | 16 | 16 | 16 | 16 | | |
| | HBA | | | | | 16 | 27 |
| | MAA | 6 | 6 | | | | |
| | DM | | | 6 | 6 | 6 | 6 |
| Dry coating amount (g/m²) | Total amount | 1.1 | 1.1 | 1.1 | 2.2 | 1.1 | 1.1 |
| | Copolymer | 0.28 | 0.28 | 0.28 | 0.32 | 0.28 | 0.28 |
| Dry coating amount (solid %/pulp) | Total amount | 2.4 | 2.4 | 2.4 | 4.9 | 2.4 | 2.4 |
| | Copolymer | 0.6 | 0.6 | 0.6 | 0.7 | 0.6 | 0.6 |
| Oil resistance | KIT | 4 | 4 | 5 | 7 | 5 | 5 |

TABLE 3-continued

|  |  | Ex. 8 | Ex. 9 | Ex. 10 | Ex. 11 | Ex. 12 | Ex. 13 |
|---|---|---|---|---|---|---|---|
| Water resistance | Cobb value | 19 | 20 | 21 | 17 | 20 | 21 |

TABLE 4

|  |  | Com. Ex. 1 | Com. Ex. 2 | Com. Ex. 3 | Com. Ex. 4 |
|---|---|---|---|---|---|
| Copolymer Monomer ingredients (pbw) | Copolymer No. | None | Com. Syn. Ex. 1 | Com. Syn. Ex. 2 | Com. Syn. Ex. 3 |
|  | StA |  |  | 78 |  |
|  | MMA |  | 78 |  |  |
|  | TBMA |  |  |  | 78 |
|  | HEA |  | 16 |  | 16 |
|  | NVP |  |  | 16 |  |
|  | MAA |  | 6 |  | 6 |
|  | DM |  |  | 6 |  |
| Dry coating amount (g/m²) | Total amount | 1.0 | 1.1 | 1.1 | 1.1 |
|  | Copolymer | 0.0 | 0.28 | 0.28 | 0.28 |
| Dry coating amount (solid %/pulp) | Total amount | 2.2 | 2.4 | 2.4 | 2.4 |
|  | Copolymer | 0.0 | 0.6 | 0.6 | 0.6 |
| Oil resistance | KIT value | 0 | 0 | 0 | 0 |
| Water resistance | Cobb value | 42 | 18 | 43 | 19 |

[Evaluation in Internal Application Method]

Example 14

As wood pulp, a pulp slurry (pulp concentration 2.5%) having a freeness (Canadian Freeness) of 600 cc was prepared from 100% by weight of bagasse pulp by a disintegrator. Alkyl ketene dimer (AKD), which is one of the sizing agents, was added to this pulp slurry such that the solid content concentration was 0.8% by weight, based on the weight of the pulp, then the water dispersion of copolymer obtained in Synthesis Example 1 was added in an amount of 1.0% by weight in terms of solid content concentration, based on the weight of the pulp, and thus a pulp slurry was prepared. Using this pulp slurry, a paper plate having a weight of 7 g was prepared by an "automatic mold tester". A KIT test performed on the resulting paper plate yielded a KIT value of 2. The results are shown in Table 5.

Example 15

A paper plate was prepared in the same manner as in Example 14 except that cationized starch was used in a solid content concentration of 1.0% by weight, based on the weight of the pulp in place of AKD of Example 14, and the water dispersion of copolymer was used in a solid content concentration of 2.0% by weight, based on the weight of the pulp. Practical Oil Test 1 performed on the resulting paper plate yielded a value of 3. The results are shown in Table 6.

Example 16

A paper plate was prepared in the same manner as in Example 15 except that the water dispersion of copolymer obtained in Synthesis Example 2 was used in place of the water dispersion of copolymer obtained in Synthesis Example 1. Practical Oil Test 1 performed on the resulting paper plate yielded a value of 5. The results are shown in Table 6.

Example 17

A paper plate was prepared in the same manner as in Example 15 except that the water dispersion of copolymer obtained in Synthesis Example 8 was used in place of the water dispersion of copolymer obtained in Synthesis Example 1. Practical Oil Test 1 performed on the resulting paper plate yielded a value of 5. The results are shown in Table 6.

Comparative Example 5

A paper plate was prepared in the same manner as in Example 14 except that the water dispersion of copolymer obtained in Synthesis Example 1 was not added. A KIT test performed on the resulting paper plate yielded a KIT value of 0. The results are shown in Table 5.

Comparative Example 6

A paper plate was prepared in the same manner as in Example 14 except that after adding AKD, the water dispersion of copolymer obtained in Comparative Synthesis Example 1 was added in a solid content concentration of 1% by weight, based on the weight of the pulp. A KIT test performed on the resulting paper plate yielded a KIT value of 0. The results are shown in Table 5.

Comparative Example 7

A paper plate was prepared in the same manner as in Example 15 except that the water dispersion of copolymer obtained in Synthesis Example 1 was not added. Practical Oil Test 1 performed on the resulting paper plate yielded a value of 1. The results are shown in Table 6.

TABLE 5

|  |  | Ex. 14 | Com. Ex. 5 | Com. Ex. 6 |
|---|---|---|---|---|
| Amount of chemical used (solid %/pulp) | Copolymer No. | Syn. Ex. 1 | — | Com. Syn. Ex. 1 |
|  | AKD | 0.8% | 0.8% | 0.8% |
|  | Copolymer | 1.0% | 0% | 1.0% |
| Oil resistance | KIT value | 2 | 0 | 0 |

TABLE 6

|  |  | Ex. 15 | Ex. 16 | Ex. 17 | Com. Ex. 7 |
|---|---|---|---|---|---|
|  | Copolymer No. | Syn. Ex. 1 | Syn. Ex. 2 | Syn. Ex. 8 | — |
| Amount of chemical used (solid %/ pulp) | Cationized starch | 1.0% | 1.0% | 1.0% | 1.0% |
|  | Copolymer | 2.0% | 2.0% | 2.0% | 0% |
| Oil resistance | Practical Oil Test 1 | 3 | 5 | 5 | 1 |

Test Example 1

The oil-resistant papers in Example 10, Example 11, Example 12, Comparative Example 1, and Comparative Example 2 were subjected to Practical Oil Test 1 and Practical Oil Test 2. The results are shown in Table 7.

TABLE 7

|  | Ex. 10 | Ex. 11 | Ex. 12 | Com. Ex. 1 | Com. Ex. 2 |
|---|---|---|---|---|---|
| Practical Oil Test 1 | 5 | 5 | 5 | 1 | 1 |
| Practical Oil Test 2 | 4 | 4 | 4 | 1 | 1 |

INDUSTRIAL APPLICABILITY

The oil-resistant agent of the present disclosure is applicable to paper for use in a food container and a food packaging material.

Examples of the embodiments of the present disclosure are as follows.

[1]

A paper oil-resistant agent comprising a fluorine-free copolymer having:
(a) a repeating unit formed from an acrylic monomer having a long-chain hydrocarbon group having 7 to 40 carbon atoms, and
(b) a repeating unit formed from an acrylic monomer having a hydrophilic group.

[2]

The paper oil-resistant agent according to [1], wherein the acrylic monomer having a long-chain hydrocarbon group (a) is a monomer represented by the formula:

$$CH_2=C(-X^1)-C(=O)-Y^1(R^1)_k$$

wherein
$R^1$ each is independently a hydrocarbon group having 7 to 40 carbon atoms,
$X^1$ is a hydrogen atom, a monovalent organic group, or a halogen atom,
$Y^1$ is a divalent to tetravalent group composed of at least one selected from a hydrocarbon group having one carbon atom, $-C_6H_4-$, $-O-$, $-C(=O)-$, $-S(=O)_2-$, or $-NH-$, provided that a hydrocarbon group is excluded, and
k is 1 to 3.

[3]

The paper oil-resistant agent according to [1] or [2], wherein in the acrylic monomer having a long-chain hydrocarbon group (a), $X^1$ is a hydrogen atom, and the long-chain hydrocarbon group has 18 or more carbon atoms.

[4]

The paper oil-resistant agent according to any one of [1] to [3], wherein
the acrylic monomer having a long-chain hydrocarbon group (a) is:
(a1) an acrylic monomer represented by the formula:

$$CH_2=C(-X^4)-C(=O)-Y^2-R^2$$

wherein
$R^2$ is a hydrocarbon group having 7 to 40 carbon atoms,
$X^4$ is a hydrogen atom, a monovalent organic group, or a halogen atom, and
$Y^2$ is $-O-$ or $-NH-$, and/or
(a2) an acrylic monomer represented by the formula:

$$CH_2=C(-X^5)-C(=O)-Y^3-Z(-Y^4-R^3)_n$$

wherein
$R^3$ each is independently a hydrocarbon group having 7 to 40 carbon atoms,
$X^5$ is a hydrogen atom, a monovalent organic group, or a halogen atom,
$Y^3$ is $-O-$ or $-NH-$,
$Y^4$ each is independently a direct bond, a group composed of at least one selected from $-O-$, $-C(=O)-$, $-S(=O)_2-$, or $-NH-$,
Z is a direct bond or a divalent or trivalent hydrocarbon group having 1 to 5 carbon atoms, and
n is 1 or 2; and
the acrylic monomer having a hydrophilic group (b) is at least one oxyalkylene (meth)acrylate represented by the formula:

$$CH_2=CX^2C(=O)-O-(RO)_n-X^3 \quad (b1)$$

and/or $$CH_2=CX^2C(=O)-O-(RO)_n-C(=O)CX^2=CH_2 \quad (b2)$$

wherein
$X^2$ is a hydrogen atom or a methyl group,
$X^3$ is a hydrogen atom or an unsaturated or saturated hydrocarbon group having 1 to 22 carbon atoms,
R is an alkylene group having 2 to 6 carbon atoms, and
n is an integer of 1 to 90.

[5]

The paper oil-resistant agent according to [2] or [4], wherein $Y^1$ or $Y^4$ is a group represented by:
$-Y'-$, $-Y'-Y'-$, $-Y'-C(=O)-$, $-C(=O)-Y'-$, $-Y'-C(=O)-Y'-$, $-Y'-R'-$, $-Y'-R'-Y'-$, $-Y'-R'-Y'-C(=O)-$, $-Y'-R'-C(=O)-Y'-$, $-Y'-R'-Y'-C(=O)-Y'-$, or $-Y'-R'-Y'-R'-$ wherein
Y' each is independently a direct bond, $-O-$, $-NH-$, or $-S(=O)_2-$, and
R' is $-(CH_2)_m-$ wherein m is an integer of 1 to 5, a linear hydrocarbon group having 1 to 5 carbon atoms and an unsaturated bond, a hydrocarbon group having 1 to 5 carbon atoms and a branched structure, or $-(CH_2)_l-C_6H_4-(CH_2)_l-$ wherein l each is independently an integer of 0 to 5, and $-C_6H_4-$ is a phenylene group.

[6]

The paper oil-resistant agent according to any one of [1] to [5], wherein
the fluorine-free copolymer further comprises a repeating unit formed from (c) a monomer having an olefinic carbon-carbon double bond and having an anion-donating group or a cation-donating group other than the monomers (a) and (b).

[7]

The paper oil-resistant agent according to [6], wherein the anion-donating group is a carboxyl group, or the cation-donating group is an amino group.

[8]

The paper oil-resistant agent according to any one of [1] to [7], wherein an amount of the repeating unit formed from the acrylic monomer having a long-chain hydrocarbon group (a) is 30 to 95% by weight, based on the copolymer.

[9]

The paper oil-resistant agent according to any one of [1] to [8], wherein an amount of the repeating unit formed from the acrylic monomer having a long-chain hydrocarbon group (a) is 30 to 90% by weight, based on the copolymer, an amount of the repeating unit formed from the acrylic monomer having a hydrophilic group (b) is 5 to 70% by weight, based on the copolymer, and the fluorine-free copolymer is a random copolymer.

[10]

The paper oil-resistant agent according to any one of [1] to [9], wherein the fluorine-free copolymer has a melting point or a glass transition point of 20° C. or higher, and/or the fluorine-free copolymer has a dynamic viscoelasticity (a complex viscosity) of 10 to 5,000 Pa·s at 90° C.

[11]

The paper oil-resistant agent according to any one of [1] to [10], further comprising a liquid medium that is water or a mixture of water and an organic solvent.

[12]

Oil-resistant paper having an oil-resistant layer comprising the paper oil-resistant agent according to any one of [1] to [11], and starch or modified starch, on a surface of the paper.

[13]

The oil-resistant paper according to [12], wherein the paper oil-resistant agent in the oil-resistant layer has a solid content of 2 g/m² or less.

[14]

Oil-resistant paper comprising the paper oil-resistant agent according to any one of [1] to [11] inside the paper.

[15]

The oil-resistant paper according to any one of [12] to [14], which is a food packaging material or a food container.

[16]

A paper treating method comprising treating paper with the paper oil-resistant agent according to any one of [1] to [11] by an external application treatment or an internal application treatment.

The invention claimed is:

1. An oil-resistant agent for paper, comprising a fluorine-free copolymer having:

(a) a repeating unit formed from an acrylic monomer having a long-chain hydrocarbon group having 7 to 40 carbon atoms, and (b) a repeating unit formed from an acrylic monomer having a hydrophilic group, wherein the acrylic monomer having a hydrophilic group (b) is at least one compound represented by the formula selected from the group consisting of:

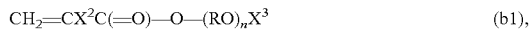  (b1),

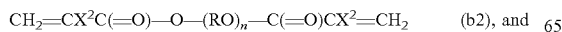  (b2), and

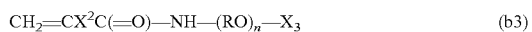  (b3)

wherein $X^2$ each is independently a hydrogen atom or a methyl group, $X^3$ each is independently a hydrogen atom, an unsaturated or saturated hydrocarbon group having 1 to 22 carbon atoms, R is an alkylene group having 2 to 6 carbon atoms, and n is an integer of 1 to 90, wherein an amount of the repeating unit formed from the monomer (b) is 5 to 70% by weight, based on the copolymer.

2. The oil-resistant agent for paper according to claim 1, wherein the acrylic monomer having a long-chain hydrocarbon group (a) is a monomer represented by the formula:

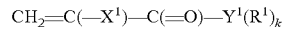

wherein $R^1$ each is independently a hydrocarbon group having 7 to 40 carbon atoms, $X^1$ is a hydrogen atom, a monovalent organic group, or a halogen atom, $Y^1$ is a divalent to tetravalent group composed of at least one selected from a hydrocarbon group having one carbon atom, —$C_6H_4$—, —O—, —C(=O)—, —S(=O)$_2$—, or —NH—, provided that a hydrocarbon group is excluded, and k is 1 to 3.

3. The oil-resistant agent for paper according to claim 2, wherein $Y^1$ or $Y^4$ is a group represented by:

—Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—, or —Y'—R'—Y'—R'— wherein

Y' each is independently a direct bond, —O—, —NH—, or —S(=O)$_2$—, and

R' is —(CH$_2$)$_m$— wherein m is an integer of 1 to 5, a linear hydrocarbon group having 1 to 5 carbon atoms and an unsaturated bond, a hydrocarbon group having 1 to 5 carbon atoms and a branched structure, or —(CH$_2$)$_l$—C$_6$H$_4$—(CH$_2$)$_l$— wherein l each is independently an integer of 0 to 5, and —C$_6$H$_4$— is a phenylene group.

4. The oil-resistant agent for paper according to claim 1, wherein, in the acrylic monomer having a long-chain hydrocarbon group (a), $X^1$ is a hydrogen atom, and the long-chain hydrocarbon group has 18 to 40 carbon atoms.

5. The oil-resistant agent for paper according to claim 1, wherein the acrylic monomer having a long-chain hydrocarbon group (a) is:

(a1) an acrylic monomer represented by the formula:

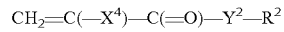

wherein $R^2$ is a hydrocarbon group having 7 to 40 carbon atoms, $X^4$ is a hydrogen atom, a monovalent organic group, or a halogen atom, and $Y^2$ is —O— or —NH—, and/or (a2) an acrylic monomer represented by the formula:

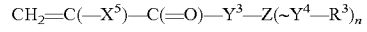

wherein $R^3$ each is independently a hydrocarbon group having 7 to 40 carbon atoms, $X^5$ is a hydrogen atom, a monovalent organic group, or a halogen atom, $Y^3$ is —O— or —NH—, Y⁴ each is independently a direct bond, or a group composed of at least one selected from —O—, —C(=O)—, —S(=O)₂—, or —NH—, Z is a direct bond or a divalent or trivalent hydrocarbon group having 1 to 5 carbon atoms, and n is 1 or 2.

6. The oil-resistant agent for paper according to claim 1, wherein the fluorine-free copolymer further comprises a repeating unit formed from (c) a monomer having an olefinic carbon-carbon double bond and having an anion-donating group or a cation-donating group, other than the monomers (a) and (b).

7. The oil-resistant agent for paper according to claim 6, wherein the anion-donating group is a carboxyl group, or the cation-donating group is an amino group.

8. The oil-resistant agent for paper according to claim 1, wherein an amount of the repeating unit formed from the acrylic monomer having a long-chain hydrocarbon group (a) is 30 to 95% by weight, based on the copolymer.

9. The oil-resistant agent for paper according to claim 1, wherein an amount of the repeating unit formed from the acrylic monomer having a long-chain hydrocarbon group (a) is 30 to 90% by weight, based on the copolymer, an amount of the repeating unit formed from the monomer having an anion-donating group or a cation-donating group (c) is 0.1 to 30% by weight, based on the fluorine-free copolymer, and the fluorine-free copolymer is a random copolymer.

10. The oil-resistant agent for paper according to claim 1, wherein the fluorine-free copolymer has a melting point or a glass transition point of 20° C. or higher, and/or the fluorine-free copolymer has a dynamic viscoelasticity (a complex viscosity) of 10 to 5,000 Pa·s at 90° C.

11. The oil-resistant agent for paper according to claim 1, further comprising a liquid medium that is water or a mixture of water and an organic solvent.

12. The oil-resistant agent for paper according to claim 1, comprising no emulsifier, and being a self-dispersive product.

13. The oil-resistant agent for paper according to claim 1, wherein the amount of the repeating unit formed from the monomer (b) is 8 to 50% by weight, based on the copolymer.

14. The oil-resistant agent for paper according to claim 1, wherein the amount of the repeating unit formed from the monomer (b) is 16 to 70% by weight, based on the copolymer.

15. The oil-resistant agent for paper according to claim 1, wherein the acrylic monomer having a hydrophilic group (b) is at least one compound represented by the formula selected from the group consisting of (b2) and (b3).

16. Oil-resistant paper having an oil-resistant layer comprising the oil-resistant agent for paper according to claim 1, and starch or modified starch, on a surface of the paper.

17. The oil-resistant paper according to claim 16, wherein the oil-resistant agent for paper in the oil-resistant layer has a solid content of 2 g/m² or less.

18. Oil-resistant paper comprising the fluorine-free copolymer of the oil-resistant agent for paper according to claim 1 inside the paper.

19. The oil-resistant paper according to claim 16, which is a food packaging material or a food container.

20. A method of treating paper, comprising treating paper with the oil-resistant agent for paper according to claim 1 by an external application treatment or an internal application treatment.

* * * * *